(12) United States Patent
Cheng et al.

(10) Patent No.: US 10,291,360 B2
(45) Date of Patent: May 14, 2019

(54) INFORMATION TRANSMISSION METHOD AND DEVICE

(71) Applicant: Huawei Technologies Co., Ltd., Shenzhen, Guangdong (CN)

(72) Inventors: Yan Cheng, Beijing (CN); Lixia Xue, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 30 days.

(21) Appl. No.: 15/049,927

(22) Filed: Feb. 22, 2016

(65) Prior Publication Data

US 2016/0173236 A1 Jun. 16, 2016

Related U.S. Application Data

(63) Continuation of application No. PCT/CN2013/082162, filed on Aug. 23, 2013.

(51) Int. Cl.
*H04L 1/18* (2006.01)
*H04W 72/04* (2009.01)
*H04L 5/00* (2006.01)
*H04L 5/14* (2006.01)

(52) U.S. Cl.
CPC .......... *H04L 1/1812* (2013.01); *H04L 1/1854* (2013.01); *H04L 5/0055* (2013.01); *H04L 5/14* (2013.01); *H04W 72/04* (2013.01); *H04W 72/042* (2013.01)

(58) Field of Classification Search
None
See application file for complete search history.

(56) References Cited

U.S. PATENT DOCUMENTS 9,386,565 B2 7/2016 Yang et al.
2013/0194931 A1* 8/2013 Lee .............. H04L 5/0053
370/241

(Continued)

FOREIGN PATENT DOCUMENTS

CN 102025467 A 4/2011
CN 102651678 A 8/2012
(Continued)

OTHER PUBLICATIONS

CATT; "Correction on implicit HARQ-ACK resource determination for PUCCH format 1b with channel selection for TDD CA with different UL-DL configurations"; Change Request; 3GPP TSG-RAN WG1 Meeting #73; R1-132691; Apr. 20-24, 2013; 12 pages.

*Primary Examiner* — Jamaal R Henson

(57) ABSTRACT

Embodiments of the present invention provide an information transmission method and device. The method includes: detecting, by user equipment in a downlink subframe set N, physical downlink shared channel PDSCH transmission or a downlink control channel indicating downlink semi-persistent scheduling SPS release; sending, by the user equipment, in an uplink subframe n corresponding to the downlink subframe set N, a hybrid automatic repeat request-acknowledgment response that corresponds to the PDSCH transmission or corresponds to the downlink control channel indicating downlink semi-persistent scheduling SPS release, where n is a subframe number and n is an integer greater than or equal to 0.

16 Claims, 5 Drawing Sheets

User equipment detects, in a downlink subframe set N, physical downlink shared channel transmission or a downlink control channel indicating downlink semi-persistent scheduling release — S110

The user equipment sends, in an uplink subframe n corresponding to the downlink subframe set N, a hybrid automatic repeat request acknowledgment response that corresponds to the PDSCH transmission or corresponds to the downlink control channel indicating downlink SPS release, where n is a subframe number, and n is a positive integer greater than or equal to 0 — S120

(56) References Cited

U.S. PATENT DOCUMENTS

| | | | |
|---|---|---|---|
| 2013/0208692 A1* | 8/2013 | Seo | H04W 72/042 370/329 |
| 2013/0315114 A1* | 11/2013 | Seo | H04L 5/001 370/280 |
| 2013/0322307 A1 | 12/2013 | Yang et al. | |
| 2013/0329688 A1* | 12/2013 | Yang | H04L 1/1861 370/329 |
| 2015/0236836 A1 | 8/2015 | Seo et al. | |
| 2016/0050059 A1 | 2/2016 | Guan et al. | |

FOREIGN PATENT DOCUMENTS

| | | |
|---|---|---|
| CN | 102752085 A | 10/2012 |
| CN | 103222222 A | 7/2013 |
| WO | WO 2010/133031 A1 | 11/2010 |
| WO | WO 2012/124969 A2 | 9/2012 |
| WO | 2012157981 A2 | 11/2012 |

* cited by examiner

INFORMATION TRANSMISSION METHOD AND DEVICE

CROSS-REFERENCE TO RELATED APPLICATIONS

This application is a continuation of International Application No. PCT/CN2013/082162, filed on Aug. 23, 2013, which is hereby incorporated by reference in its entirety.

TECHNICAL FIELD

Embodiments of the present invention relate to communications technologies, and in particular, to an information transmission method and device.

BACKGROUND

In a long term evolution-advanced (LTE-A) system, after a carrier aggregation (CA) technology is applied, user equipment can access multiple component carriers at the same time to transmit and receive data. To support hybrid automatic retransmission, the user equipment needs to feed back a hybrid automatic repeat request-acknowledgement (HARQ-ACK) response to a base station by using an uplink channel. In an existing CA system, the HARQ-ACK response is sent only on a primary component carrier.

In subsequent evolution systems, carrier aggregation evolves to be aggregation across different duplexing manners, and/or across different base stations. In this scenario, for user equipment that has only an uplink single transmission capability, in one subframe, the user equipment can perform uplink transmission in only one serving cell, and therefore, the user equipment needs to operate across different serving cells in a time division multiplexing manner. Therefore, for each serving cell, in one radio frame, only some subframes are used for uplink transmission. For an FDD serving cell, according to existing HARQ-ACK timing of the FDD serving cell, because in one radio frame, only some uplink subframes can be used for uplink transmission of the serving cell, some downlink subframes in one radio frame do not have corresponding uplink subframes for feeding back HARQ-ACK responses. Consequently, these downlink subframes cannot be invoked, and the utilization of system resources is significantly decreased.

SUMMARY

Embodiments of the present invention provide an information transmission method and device, so as to improve the utilization of system resources.

According to a first aspect, an embodiment of the present invention provides an information transmission method, including:

detecting, by user equipment in a downlink subframe set N, physical downlink shared channel PDSCH transmission or a downlink control channel indicating downlink semi-persistent scheduling SPS release; and sending, by the user equipment, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number and n is an integer greater than or equal to 0.

In a first possible implementation manner of the first aspect, a correspondence between the downlink subframe set N and the uplink subframe n is $N=\{n-k_0, n-k_1, \ldots, n-k_{M-1}\}$, where $k_0, k_1, \ldots k_{M-1}$ are positive integers and are elements in a set K, and M is a quantity of elements included in the set K.

According to the first possible implementation manner of the first aspect, in a second possible implementation manner of the first aspect, if the PDSCH transmission or the downlink control channel indicating downlink SPS release corresponds to a first serving cell, the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release includes: in the uplink subframe n corresponding to the downlink subframe set N, sending, by the user equipment in the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to a second serving cell, the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release includes: in the uplink subframe n corresponding to the downlink subframe set N, sending, by the user equipment in the second serving cell, the hybrid automatic repeat request-acknowledgment response that corresponds to the PDSCH transmission or corresponds to the downlink control channel indicating downlink SPS release, where the first serving cell and the second serving cell are both serving cells corresponding to the user equipment.

According to the first or second possible implementation manner of the first aspect, in a third possible implementation manner of the first aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the first aspect, in a fourth possible implementation manner of the first aspect, if the PDSCH transmission or the downlink control channel indicating downlink SPS release corresponds to the first serving cell, the uplink subframe n is subframe 0 and subframe 5 in a radio frame, and the set K is $\{8, 7, 6, 5, 4\}$; or if the PDSCH transmission or the downlink control channel indicating downlink SPS release corresponds to the second serving cell, the uplink subframe n is subframe 1 and subframe 6 in a radio frame, and the set K is $\{8, 7, 6, 5, 4\}$, where the first serving cell and the second serving cell are both serving cells corresponding to the user equipment, and duplexing manners corresponding to the first serving cell and the second serving cell are both frequency division duplex FDD.

According to the fourth possible implementation manner of the first aspect, in a fifth possible implementation manner of the first aspect, in subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

According to the first or second possible implementation manner of the first aspect, in a sixth possible implementation manner of the first aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the first aspect, in a seventh possible implementation manner of the first aspect, if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the first aspect, in an eighth possible implementation manner of the first aspect, in subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

According to the first or second possible implementation manner of the first aspect, in a ninth possible implementation manner of the first aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the first aspect, in a tenth possible implementation manner of the first aspect, before the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release, the method further includes: receiving, by the user equipment, higher layer signaling sent by a base station, where the higher layer signaling includes information indicating the uplink subframe n and indicating the correspondence between the downlink subframe set N and the uplink subframe n.

According to a second aspect, an embodiment of the present invention provides another information transmission method, including:

sending, by a base station in a downlink subframe set N to user equipment, physical downlink shared channel PDSCH transmission or a downlink control channel indicating downlink semi-persistent scheduling SPS release; and receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

In a first possible implementation manner of the second aspect, a correspondence between the downlink subframe set N and the uplink subframe n is $N=\{n-k_0, n-k_1, \ldots, n-k_{M-1}\}$, where $k_0, k_1, \ldots, k_{M-1}$ are positive integers and are elements in a set K, and M is a quantity of elements included in the set K.

According to the first possible implementation manner of the second aspect, in a second possible implementation manner of the second aspect, if the base station is a base station corresponding to a first serving cell, and the PDSCH transmission or the downlink control channel indicating downlink SPS release corresponds to the first serving cell, the receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release includes: in the uplink subframe n corresponding to the downlink subframe set N, receiving, by the base station on the first serving cell, the hybrid automatic repeat request-acknowledgment response that is sent by the user equipment and that corresponds to the PDSCH transmission or corresponds to the downlink control channel indicating downlink SPS release; or if the base station is a base station corresponding to a second serving cell, and the PDSCH transmission or the downlink control channel indicating downlink SPS release corresponds to the second serving cell, the receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release includes: in the uplink subframe n corresponding to the downlink subframe set N, receiving, by the base station on the second serving cell, the hybrid automatic repeat request-acknowledgment response that is sent by the user equipment and that corresponds to the PDSCH transmission or corresponds to the downlink control channel indicating downlink semi-persistent scheduling SPS release, where the first serving cell and the second serving cell are both serving cells corresponding to the user equipment.

According to the first or second possible implementation manner of the second aspect, in a third possible implementation manner of the second aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the second aspect, in a fourth possible implementation manner of the second aspect, if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

According to the fourth possible implementation manner of the second aspect, in a fifth possible implementation manner of the second aspect, in subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the second aspect, in a sixth possible implementation manner of the second aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the second aspect, in a seventh possible implementation manner of the second aspect, if the base station is the base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the base station is the base station corresponding to the second serving cell, and the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the second aspect, in an eighth possible implementation manner of the second aspect, in subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the second aspect, in a ninth possible implementation manner of the second aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the second aspect, in a tenth possible implementation manner of the second aspect, before the receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, the method further includes: sending, by the base station, higher layer signaling to the user equipment, where the higher layer signaling includes information indicating the uplink subframe n and indicating the correspondence between the downlink subframe set N and the uplink subframe n.

According to a third aspect, an embodiment of the present invention provides user equipment, including:

a detection module, configured to detect, in a downlink subframe set N, physical downlink shared channel PDSCH transmission or a downlink control channel indicating downlink semi-persistent scheduling SPS release; and a sending module, configured to send, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number, and n is an integer greater than or equal to 0.

In a first possible implementation manner of the third aspect, a correspondence between the downlink subframe set N and the uplink subframe n is N={n−$k_0$, n−$k_1$, . . . , n−$k_{M-1}$}, where $k_0$, $k_1$, . . . , $k_{M-1}$ are positive integers and are elements in a set K, and M is a quantity of elements included in the set K.

According to the first possible implementation manner of the third aspect, in a second possible implementation manner of the third aspect, if the PDSCH transmission or the downlink control channel indicating downlink SPS release corresponds to a first serving cell, the sending module is configured to: in the uplink subframe n corresponding to the downlink subframe set N, send, on the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to a second serving cell, the sending module is configured to: in the uplink subframe n corresponding to the downlink subframe set N, send, on the second serving cell, the hybrid automatic repeat request-acknowledgment response that corresponds to the PDSCH transmission or corresponds to the downlink control channel indicating downlink SPS release, where the first serving cell and the second serving cell are both serving cells corresponding to the user equipment.

According to the first or second possible implementation manner of the third aspect, in a third possible implementation manner of the third aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the third aspect, in a fourth possible implementation manner of the third aspect, if the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

According to the fourth possible implementation manner of the third aspect, in a fifth possible implementation manner of the third aspect, in subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

According to the first or second possible implementation manner of the third aspect, in a sixth possible implementation manner of the third aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the third aspect, in a seventh possible implementation manner of the third aspect, if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the third aspect, in an eighth possible implementation manner of the third aspect, in subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

According to the first or second possible implementation manner of the third aspect, in a ninth possible implementation manner of the third aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |

-continued

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the third aspect, in a tenth possible implementation manner of the third aspect, the user equipment further includes: a receiving module, configured to receive higher layer signaling sent by a base station, where the higher layer signaling includes information indicating the uplink subframe n and indicating the correspondence between the downlink subframe set N and the uplink subframe n.

According to a fourth aspect, an embodiment of the present invention provides an information transmission device, where the information transmission device is a base station and includes: a sending module, configured to send, in a downlink subframe set N to user equipment, physical downlink shared channel PDSCH transmission or a downlink control channel indicating downlink semi-persistent scheduling SPS release; and a receiving module, configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

In a first possible implementation manner of the fourth aspect, a correspondence between the downlink subframe set N and the uplink subframe n is N={n−$k_0$, n−$k_1$, . . . , n−$k_{M-1}$}, where $k_0$, $k_1$, . . . , $k_{M-1}$ are positive integers and are elements in a set K, and M is a quantity of elements included in the set K.

According to the first possible implementation manner of the fourth aspect, in a second possible implementation manner of the fourth aspect, if the base station is a base station corresponding to a first serving cell, and the PDSCH transmission or the downlink control channel indicating downlink SPS release corresponds to the first serving cell, the receiving module is configured to: in the uplink subframe n corresponding to the downlink subframe set N, receive, on the first serving cell, the hybrid automatic repeat request-acknowledgment response that is sent by the user equipment and that corresponds to the PDSCH transmission or corresponds to the downlink control channel indicating downlink SPS release; or if the base station is a base station corresponding to a second serving cell, and the PDSCH transmission or the downlink control channel indicating downlink SPS release corresponds to the second serving cell, the receiving module is configured to: in the uplink subframe n corresponding to the downlink subframe set N, receive, on the second serving cell, the hybrid automatic repeat request-acknowledgment response that is sent by the user equipment and that corresponds to the PDSCH transmission or corresponds to the downlink control channel indicating downlink semi-persistent scheduling SPS release, where the first serving cell and the second serving cell are both serving cells corresponding to the user equipment.

According to the first or second possible implementation manner of the fourth aspect, in a third possible implementation manner of the fourth aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the fourth aspect, in a fourth possible implementation manner of the fourth aspect, if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

According to the fourth possible implementation manner of the fourth aspect, in a fifth possible implementation manner of the fourth aspect, in subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the fourth aspect, in a sixth possible implementation manner of the fourth aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the fourth aspect, in a seventh possible implementation manner of the fourth aspect, if the base station is the base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the base station is the base station corresponding to the second serving cell, and the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the fourth aspect, in an eighth possible implementation manner of the fourth aspect, in subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the fourth aspect, in a ninth possible implementation manner of the fourth aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the fourth aspect, in a tenth possible implementation manner of the fourth aspect, the sending module is further configured to send higher layer signaling to the user equipment, where the higher layer signaling includes information indicating the uplink subframe n and indicating the correspondence between the downlink subframe set N and the uplink subframe n.

According to a fifth aspect, an embodiment of the present invention provides another user equipment, including:

a receiver, configured to detect, in a downlink subframe set N, physical downlink shared channel PDSCH transmission or a downlink control channel indicating downlink semi-persistent scheduling SPS release; and a transmitter, configured to send, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number, and n is an integer greater than or equal to 0.

In a first possible implementation manner of the fifth aspect, a correspondence between the downlink subframe set N and the uplink subframe n is $N=\{n-k_0, n-k_1, \ldots, n-k_{M-1}\}$, where $k_0, k_1, \ldots, k_{M-1}$ are positive integers and are elements in a set K, and M is a quantity of elements included in the set K.

According to the first possible implementation manner of the fifth aspect, in a second possible implementation manner of the fifth aspect, if the PDSCH transmission or the downlink control channel indicating downlink SPS release corresponds to a first serving cell, the transmitter is configured to: in the uplink subframe n corresponding to the downlink subframe set N, send, on the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to a second serving cell, the transmitter is configured to: in the uplink subframe n corresponding to the downlink subframe set N, send, on the second serving cell, the hybrid automatic repeat request-acknowledgment response that corresponds to the PDSCH transmission or corresponds to the downlink control channel indicating downlink SPS release, where the first serving cell and the second serving cell are both serving cells corresponding to the user equipment.

According to the first or second possible implementation manner of the fifth aspect, in a third possible implementation manner of the fifth aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the fifth aspect, in a fourth possible implementation manner of the fifth aspect, if the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

According to the fourth possible implementation manner of the fifth aspect, in a fifth possible implementation manner of the fifth aspect, in subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

According to the first or second possible implementation manner of the fifth aspect, in a sixth possible implementation manner of the fifth aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the fifth aspect, in a seventh possible implementation manner of the fifth aspect, if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the fifth aspect, in an eighth possible implementation manner of the fifth aspect, in subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

According to the first or second possible implementation manner of the fifth aspect, in a ninth possible implementation manner of the fifth aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the fifth aspect, in a tenth possible implementation manner of the fifth aspect, the receiver is further configured to: receive higher layer signaling sent by a base station, where the higher layer signaling includes information indicating the uplink subframe n and indicating the correspondence between the downlink subframe set N and the uplink subframe n.

According to a sixth aspect, an embodiment of the present invention provides another information transmission device, where the information transmission device is a base station and includes: a transmitter, configured to send, in a downlink subframe set N to user equipment, physical downlink shared channel PDSCH transmission or a downlink control channel indicating downlink semi-persistent scheduling SPS release; and a receiver, configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

In a first possible implementation manner of the sixth aspect, a correspondence between the downlink subframe set N and the uplink subframe n is $N=\{n-k_0, n-k_1, \ldots, n-k_{M-1}\}$, where $k_0, k_1, \ldots, k_{M-1}$ are positive integers and are elements in a set K, and M is a quantity of elements included in the set K.

According to the first possible implementation manner of the sixth aspect, in a second possible implementation manner of the sixth aspect, if the base station is a base station corresponding to a first serving cell, and the PDSCH transmission or the downlink control channel indicating downlink SPS release corresponds to the first serving cell, the receiver is configured to: in the uplink subframe n corresponding to the downlink subframe set N, receive, on the first serving cell, the hybrid automatic repeat request-acknowledgment response that is sent by the user equipment and that corresponds to the PDSCH transmission or corresponds to the downlink control channel indicating downlink SPS release; or if the base station is a base station corresponding to a second serving cell, and the PDSCH transmission or the downlink control channel indicating downlink SPS release corresponds to the second serving cell, the receiver is configured to: in the uplink subframe n corresponding to the downlink subframe set N, receive, on the second serving cell, the hybrid automatic repeat request-acknowledgment response that is sent by the user equipment and that corresponds to the PDSCH transmission or corresponds to the downlink control channel indicating downlink semi-persistent scheduling SPS release, where the first serving cell and the second serving cell are both serving cells corresponding to the user equipment.

According to the first or second possible implementation manner of the sixth aspect, in a third possible implementation manner of the sixth aspect, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

According to the first or second possible implementation manner of the sixth aspect, in a fourth possible implementation manner of the sixth aspect, if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

According to the fourth possible implementation manner of the sixth aspect, in a fifth possible implementation manner of the sixth aspect, in subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the sixth aspect, in a sixth possible implementation manner of the sixth aspect, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

According to the first or second possible implementation manner of the sixth aspect, in a seventh possible implementation manner of the sixth aspect, if the base station is the base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the base station is the base station corresponding to the second serving cell, and the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

According to the seventh possible implementation manner of the sixth aspect, in an eighth possible implementation manner of the sixth aspect, in subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

According to the first or second possible implementation manner of the sixth aspect, in a ninth possible implementation manner of the sixth aspect, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

According to any one of the foregoing nine possible implementation manners of the sixth aspect, in a tenth possible implementation manner of the sixth aspect, the transmitter is further configured to send higher layer signaling to the user equipment, where the higher layer signaling includes information indicating the uplink subframe n and indicating the correspondence between the downlink subframe set N and the uplink subframe n.

In the information transmission method and device provided by the embodiments of the present invention, hybrid automatic repeat request-acknowledgment timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving the utilization of system resources.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
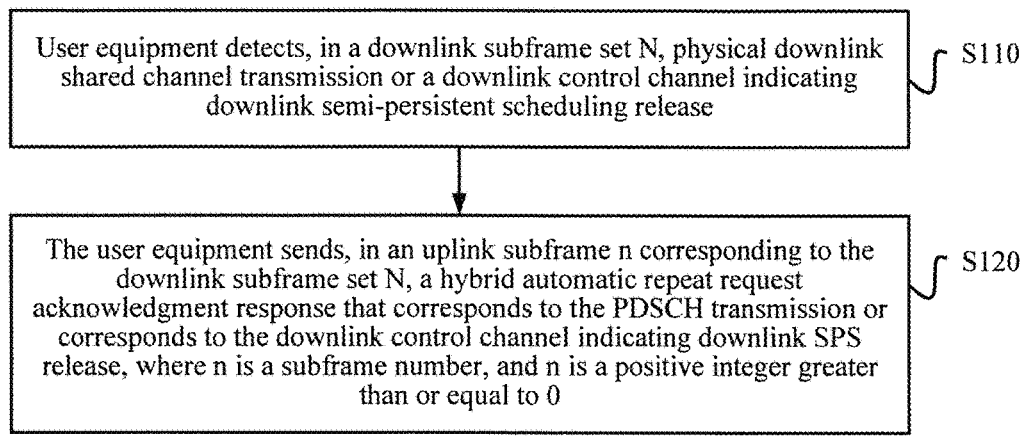
FIG. 1 is a flowchart of Embodiment 1 of an information transmission method according to the present invention.

FIG. 1 is a flowchart of Embodiment 1 of an information transmission method according to the present invention. As shown in FIG. 1, the information transmission method provided by this embodiment may include:

S110: User equipment detects, in a downlink subframe set N, physical downlink shared channel PDSCH transmission or a downlink control channel indicating downlink semi-persistent scheduling (SPS) release.

In this step, the detecting, by user equipment in a downlink subframe set N, PDSCH transmission or a downlink control channel indicating downlink SPS release may be receiving, by the user equipment in the downlink subframe set N, the PDSCH transmission or the downlink control channel indicating downlink SPS release, or may be obtaining, by the user equipment in the downlink subframe set N by means of detection, the PDSCH transmission or the downlink control channel indicating downlink SPS release. The downlink control channel in this embodiment may be a PDCCH or an EPDCCH.

When the PDSCH transmission has a corresponding downlink control channel in a downlink subframe in which the PDSCH transmission is performed, this step may also be described as follows: the user equipment detects a downlink control channel in the downlink subframe set N, where the downlink control channel is a PDCCH or an enhanced physical downlink control channel (EPDCCH), and the downlink control channel is used for indicating PDSCH transmission or used for indicating downlink SPS release.

S120: The user equipment sends, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number, and n is an integer greater than or equal to 0.

In this step, the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release may be sending, by the user equipment to a base station in the uplink subframe n corresponding to the downlink subframe set N, the hybrid automatic repeat request-acknowledgment response that corresponds to the PDSCH transmission or corresponds to the downlink control channel indicating downlink SPS release.

According to an HARQ mechanism, the user equipment needs to feed back an HARQ-ACK response for the PDSCH transmission or for the downlink control channel indicating downlink SPS release, where the response is received in the downlink subframe set N. Therefore, the user equipment first needs to determine, according to predefined HARQ-ACK timing, an uplink subframe n for feeding back the HARQ-ACK response. Then, the user equipment sends the HARQ-ACK response in the determined uplink subframe n.

The subframe number refers to a number of a subframe in multiple radio frames, and may be obtained in the following manner: numbering, in chronological order, subframes in multiple radio frames in a monotonically increasing manner starting from 0, that is, if the last subframe of a previous radio frame is numbered n', the first subframe of a current radio frame is numbered n'+1. In addition, in multiple radio frames, each subframe also has a subframe sequence number in a radio frame in which the subframe is located, and this subframe sequence number is a subframe sequence number of this subframe in this radio frame. For example, if a subframe n is subframe 0 in a radio frame, it may refer to that a subframe sequence number of the subframe n is 0 in the radio frame in which the subframe n is located, or that the subframe n is the first subframe in the radio frame in which the subframe n is located, or that the subframe n corresponds to the first subframe in each radio frame.

The hybrid automatic repeat request-acknowledgment response that corresponds to the PDSCH transmission or corresponds to the downlink control channel indicating downlink SPS release may be an acknowledgment ACK (Acknowledgement) or a negative acknowledgment NACK (Negative Acknowledgement). When the downlink subframe set N includes multiple downlink subframes, if no PDSCH transmission or downlink control channel indicating downlink SPS release is detected in a downlink subframe in the downlink subframe set N, and if an HARQ-ACK response also needs to be fed back in the downlink subframe in which no PDSCH transmission or downlink control channel indicating downlink SPS release is detected, the HARQ-ACK response may be discontinuous transmission (DTX) or a negative acknowledgment (NACK).

In the information transmission method provided by this embodiment, HARQ-ACK timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving the utilization of system resources.

Further, a correspondence between the downlink subframe set N and the uplink subframe n may be $N=\{n-k_0, n-k_1, \ldots, n-k_{M-1}\}$, where $k_0, k_1, \ldots, k_{M-1}$ are positive integers and are elements in a set K, and M is a quantity of elements included in the set K; in other words, elements $k_0, k_1, \ldots, k_{M-1}$ belong to the set K, and the set K is a set $\{k_0, k_1, \ldots, k_{M-1}\}$ including M elements. $n-k_1, \ldots,$ and $n-k_{M-1}$ may be subframe numbers corresponding to downlink subframes in the downlink subframe set N, that is, the downlink subframe set $N=\{n-k_0, n-k_1, \ldots, n-k_{M-1}\}$ may refer to that the downlink subframe set N is a set of downlink subframe $n-k_0$, downlink subframe $n-k_1, \ldots,$ and downlink subframe $n-k_{M-1}$.

Further optionally, if serving cells corresponding to the user equipment include a first serving cell and a second serving cell, and if the PDSCH transmission or the downlink control channel indicating downlink SPS release corresponds to the first serving cell, the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release in step S120 may be: in the uplink subframe n corresponding to the downlink subframe set N, sending, by the user equipment in the first serving cell, the hybrid automatic repeat request-acknowledgment response that corresponds to the PDSCH transmission or corresponds to the downlink control channel indicating downlink SPS release; or if the PDSCH transmission or downlink control channel indicating downlink SPS release corresponds to the second serving cell, the sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release in step S120 may be: in the uplink subframe n corresponding to the downlink subframe set N, sending, by the user equipment in the second serving cell, the hybrid automatic repeat request-acknowledgment response that corresponds to the PDSCH transmission or corresponds to the downlink control channel indicating downlink SPS release.

In all the embodiments of the present invention, the serving cells corresponding to the user equipment may refer to serving cells that are configured by a network side device (such as a base station) for the user equipment, or refer to serving cells that serve the user equipment, or refer to serving cells accessed by the user equipment. That serving cells corresponding to the user equipment include a first serving cell and a second serving cell may refer to that the serving cells configured by the base station for the user equipment include the first serving cell and the second serving cell, or may refer to that the serving cells accessed by the user equipment include the first serving cell and the second serving cell. It should be noted that, the serving cells corresponding to the user equipment may also refer to component carriers of the user equipment, where the first serving cell may be referred to as a first component carrier and the second serving cell may also be referred to as a second component carrier.

Further optionally, before the sending, by the user equipment in an uplink subframe n corresponding to the downlink subframe set N, a hybrid automatic repeat request acknowledgment-response that corresponds to the PDSCH transmission or corresponds to the downlink control channel indicating downlink SPS release, the method may further include: receiving, by the user equipment, higher layer signaling sent by a base station, where the higher layer signaling includes information indicating the correspondence between the downlink subframe set N and the uplink subframe n, or the higher layer signaling includes information indicating the uplink subframe n, and the uplink subframe n corresponds to a predefined downlink subframe set. For example, according to the indication of the higher layer signaling, the uplink subframe n may be subframe 0 and subframe 5 in a radio frame, or subframe 1 and subframe 6 in a radio frame, or subframe 2 and subframe 7 in a radio frame, or subframe 3 and subframe 8 in a radio frame, or subframe 4 and subframe 9 in a radio frame, and in this case, the predefined downlink subframe set may be N={n−8, n−7, n−6, n−5, n−4}. For another example, according to the indication of the higher layer signaling, the uplink subframe n is subframe 0, subframe 1, subframe 5 and subframe 6 in a radio frame, and in this case, the predefined downlink subframe set is as follows: when the uplink subframe n is subframe 0 and subframe 5 in the radio frame, the predefined downlink subframe set is N={n−7, n−6, n−5}, and when the uplink subframe n is subframe 1 and subframe 6 in the radio frame, the predefined downlink subframe set is N={n−5, n−4}. For another example, according to the indication of the higher layer signaling, the uplink subframe n is subframe 2, subframe 3, subframe 7 and subframe 8 in a radio frame, and in this case, the predefined downlink subframe set is as follows: when the uplink subframe n is subframe 2 and subframe 7 in the radio frame, the predefined downlink subframe set is N={n−7, n−6, n−5}, and when the uplink subframe n is subframe 3 and subframe 8 in the radio frame, the predefined downlink subframe set is N={n−5, n−4}.

Further optionally, the uplink subframe n may be subframe A and subframe B, a difference between subframe numbers of subframe A and subframe B is 5, and the set K includes elements 8, 7, 6, 5, and 4; in this case, the correspondence may be N={n−8, n−7, n−6, n−5, n−4}.

Specifically, it may be that: the uplink subframe n is subframe 0 and subframe 5 in a radio frame, and the set K includes elements 8, 7, 6, 5, and 4, for example, the set K is {8, 7, 6, 5, 4}; or the uplink subframe n is subframe 1 and subframe 6 in a radio frame, and the set K includes elements 8, 7, 6, 5, and 4, for example, the set K is {8, 7, 6, 5, 4}. It should be noted that, the uplink subframe n being subframe 0 and subframe 5 in a radio frame herein may refer to that the uplink subframe n is subframe 0 and subframe 5 in each radio frame, or may refer to that the uplink subframe n corresponds to the first subframe and the sixth subframe in each radio frame. In this case, in subframe 0 and subframe 5 in each radio frame, an HARQ-ACK can be transmitted, and subframe 0 and subframe 5 each have a corresponding downlink subframe set. For example, if the user equipment detects, in a downlink subframe set N corresponding to subframe 0, PDSCH transmission or a downlink control channel indicating downlink SPS release, the user equipment sends, in subframe 0, an HARQ-ACK response that corresponds to the PDSCH transmission or corresponds to the downlink control channel indicating downlink SPS release, and subframe 0 herein is uplink subframe 0. For another example, if the user equipment detects, in a downlink subframe set N corresponding to subframe 5, PDSCH transmission or a downlink control channel indicating downlink SPS release, the user equipment sends, in subframe 5, an HARQ-ACK response that corresponds to the PDSCH transmission or corresponds to the downlink control channel indicating downlink SPS release, and subframe 5 herein is uplink subframe 5. 0 and 5 herein are subframe sequence numbers of the subframe n in a radio frame in which the subframe n is located. The uplink subframe n being subframe 1 and subframe 6 in a radio frame is similar, and details are not described herein again.

Further optionally, if serving cells corresponding to the user equipment include a first serving cell and a second serving cell, and if the PDSCH transmission or downlink control channel indicating downlink SPS release corresponds to the first serving cell, the uplink subframe n is subframe 0 and subframe 5 in a radio frame, and the set K includes elements 8, 7, 6, 5, and 4, for example, the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K includes elements 8, 7, 6, 5, and 4, for example, the set K is {8, 7, 6, 5, 4}, where the first serving cell and the second serving cell are both serving cells corresponding to the user equipment, and duplexing manners corresponding to the first serving cell and the second serving cell are both frequency division duplex FDD. In subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

In all the embodiments of the present invention, that the user equipment performs information transmission in the first serving cell may refer to that the user equipment sends information and/or receives information on the first serving cell; that the user equipment performs information transmission in the second serving cell may refer to that the user equipment sends information and/or receives information on the second serving cell. That the user equipment sends information on the first serving cell may refer to that the user equipment sends information on an uplink carrier corresponding to the first serving cell, and that the user equipment receives information on the first serving cell may refer to that the user equipment receives information on a downlink carrier corresponding to the first serving cell; that the user equipment sends information on the second serving cell may refer to that the user equipment sends information on an uplink carrier corresponding to the second serving cell, and that the user equipment receives information on the second serving cell may refer to that the user equipment receives information on a downlink carrier corresponding to the second serving cell. For user equipment that has a single uplink transmission capability and a dual downlink receiving capability in one subframe, in this implementation manner, that the user equipment performs information transmission in the first serving cell is preferably that the user equipment sends information on the first serving cell; in this implementation manner, that the user equipment performs information transmission in the second serving cell is preferably that the user equipment sends information on the second serving cell; and in this implementation manner, that the user equipment performs information transmission in the first serving cell or the second serving cell is preferably that the user equipment sends information on the first serving cell or the second serving cell, and in this case, in each downlink subframe, the user equipment can receive information on the first serving cell and the second serving cell simultaneously.

That in subframe 0 and subframe 5 in the radio frame, the user equipment performs information transmission in the first serving cell may refer to that in subframe 0 and subframe 5 in the radio frame, the user equipment can perform information transmission only in the first serving cell. That in subframe 1 and subframe 6 in the radio frame, the user equipment performs information transmission in the second serving cell may refer to that in subframe 1 and subframe 6 in the radio frame, the user equipment can perform information transmission only in the second serving cell. That in subframe 2, subframe 3, subframe 4, subframe 7, subframe 8, and subframe 9 in the radio frame, the user equipment performs information transmission in the first serving cell or the second serving cell may refer to that in subframe 2, subframe 3, subframe 4, subframe 7, subframe 8, and subframe 9 in the radio frame, the user equipment may perform information transmission in the first serving cell or the second serving cell, and specifically, it may be determined, semi-statically according to the higher layer signaling, whether to perform information transmission in the first serving cell or on the second serving cell, or it may be determined, dynamically according to physical layer signaling, whether to perform information transmission in the first serving cell or on the second serving cell.

In all the embodiments of the present invention, that the PDSCH transmission or the downlink control channel indicating downlink SPS release corresponds to the first serving cell may refer to that the user equipment detects, in the downlink subframe set N, the PDSCH transmission carried by the first serving cell or the downlink control channel that is carried by the first serving cell and that indicates downlink SPS release, or may refer to that the user equipment detects, in the downlink subframe set N, a PDSCH transmitted on the first serving cell or the downlink control channel that is transmitted on the first serving cell and that indicates downlink SPS release, or may refer to that the PDSCH transmission or the downlink control channel indicating downlink SPS release is carried on the first serving cell. That the PDSCH transmission or the downlink control channel indicating downlink SPS release corresponds to the second serving cell may refer to that the user equipment detects, in the downlink subframe set N, the PDSCH transmission carried on the second serving cell or the downlink control channel that is carried on the second serving cell and that indicates downlink SPS release, or may refer to that the user equipment detects, in the downlink subframe set N, a PDSCH transmitted on the second serving cell or the downlink control channel that is transmitted on the second serving cell and that indicates downlink SPS release, or may refer to that the PDSCH transmission or the downlink control channel indicating downlink SPS release is carried on the second serving cell.

Figure 2:
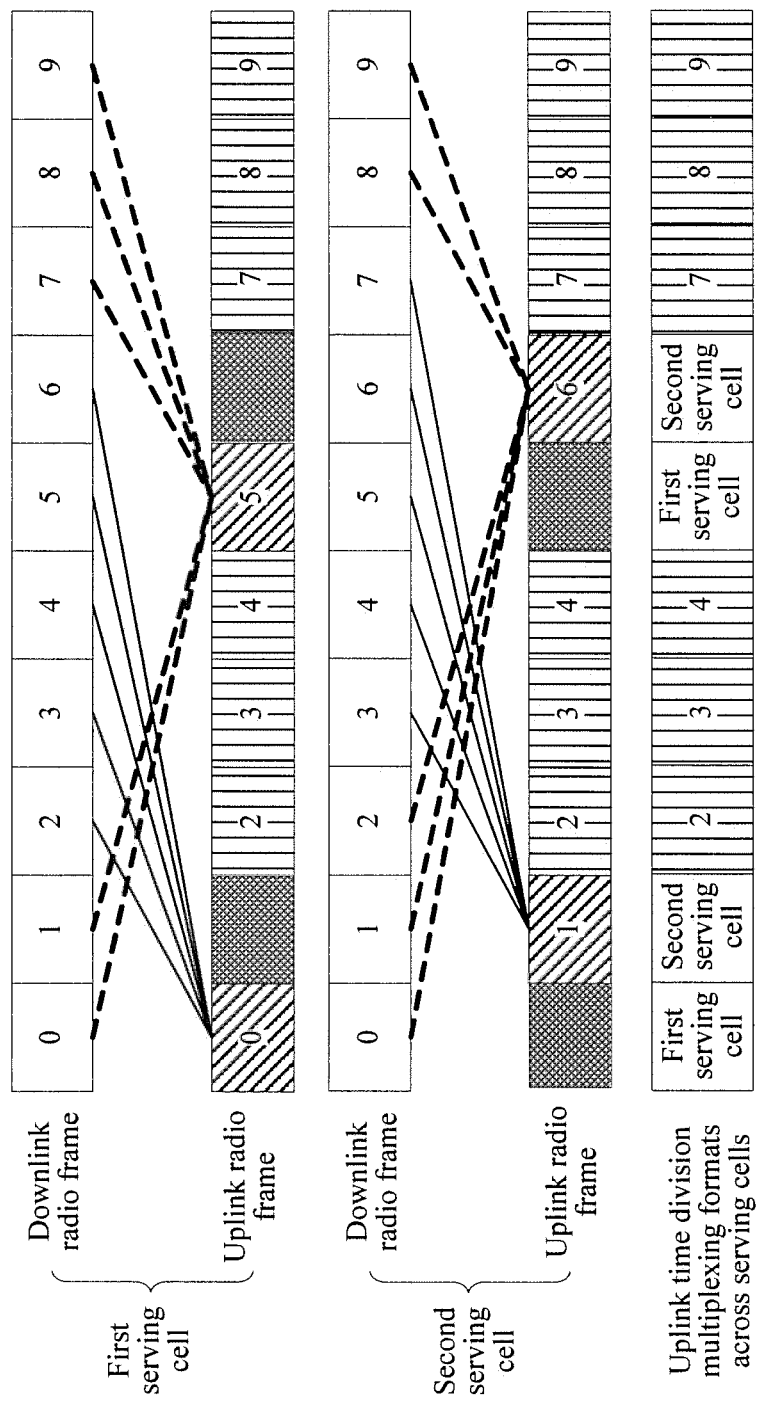
FIG. 2 is a schematic diagram of Embodiment 2 of an information transmission method according to the present invention.

Specific embodiments of the foregoing implementation manners are listed below, so as to describe the embodiments of the present invention in further detail:

FIG. 2 is a schematic diagram of Embodiment 2 of an information transmission method according to the present invention. As shown in FIG. 2, serving cells corresponding to user equipment include a first serving cell and a second serving cell, and duplexing manners corresponding to the first serving cell and the second serving cell are both frequency division duplex FDD.

Specifically, if the PDSCH transmission or the downlink control channel indicating downlink SPS release received in S110 in FIG. 1 corresponds to the first serving cell, the uplink subframe n in S120 corresponds to subframe 0 and subframe 5 in a radio frame, and the set K is {8, 7, 6, 5, 4}.

If the PDSCH transmission or the downlink control channel indicating downlink SPS release received in S110 in FIG. 1 corresponds to the second serving cell, the uplink subframe n in S120 corresponds to subframe 1 and subframe 6 in a radio frame, and the set K is {8, 7, 6, 5, 4}.

It should be noted that, HARQ-ACK timing of the second serving cell may also be other timing, for example, if the PDSCH transmission or the downlink control channel indicating downlink SPS release received in S110 in FIG. 1 corresponds to the second serving cell, the uplink subframe n in S120 corresponds to subframe 2 and subframe 7 in an uplink radio frame, and the set K is {8, 7, 6, 5, 4} (not shown in FIG. 2). If on the second serving cell, a hybrid automatic repeat request-acknowledgment is fed back by using subframe 2 and subframe 7, subframe 2 and subframe 7 are separately spaced by one subframe from subframe 0 and subframe 5 that are used on the first serving cell, uplink subframe time loss caused by radio frequency conversion does not occur, and HARQ-ACK performance is not affected. However, generally, a radio frequency conversion time of the user equipment is not long, and on the second serving cell, when subframe 1 and subframe 6 are used as uplink subframes, operation can also be desirable.

In this scenario, in subframe 0 and subframe 5 in the radio frame, the user equipment needs to transmit, on the first serving cell, an HARQ-ACK response of the first serving cell; and in subframe 1 and subframe 6 in the radio frame, the user equipment needs to transmit, on the second serving cell, an HARQ-ACK response of the second serving cell. Therefore, in these subframes, the user equipment needs to operate on corresponding serving cells, while in other uplink subframes, the user equipment may operate on any one of all serving cells. Therefore, in this case, time division multiplexing manners of the user equipment in corresponding serving cells are as follows:

In subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell. The radio frame herein may refer to one radio frame, or may refer to each radio frame in multiple radio frames.

In the foregoing implementation manner, in one aspect, hybrid automatic repeat request-acknowledgment timing of an FDD serving cell is designed to resolve a problem that some downlink subframes on the FDD serving cell do not have corresponding uplink subframes for feeding back HARQ-ACK responses, so that a base station can also send information to user equipment in these downlink subframes, thereby improving system utilization. In another aspect, fixed HARQ-ACK timing of each serving cell is defined and it is only limited that in subframe 0 and subframe 5 of an uplink radio frame, the user equipment fixedly operates on a first serving cell, and that in subframe 1 and subframe 6 (or subframe 2 and subframe 7) in the uplink radio frame, the user equipment fixedly operates on a second serving cell, while in other subframes, the user equipment may be configured to operate on the first serving cell or the second serving cell according to an actual situation; therefore, subframe patterns of time division multiplexing of the user equipment across different cells are not limited, and for different subframe patterns, each serving cell has only one set of HARQ-ACK timing, thereby reducing complexity of the user equipment.

The foregoing implementation manner may be specifically applied to the scenario shown in FIG. 2, but the application is not limited to this scenario: Serving cells corresponding to user equipment include a first serving cell and a second serving cell; duplexing manners corresponding to the first serving cell and the second serving cell are both frequency division duplex FDD; between the first serving cell and the second serving cell is a non-ideal backhaul route; a base station corresponding to the first serving cell may be a macro base station, and a base station corresponding to the second serving cell may be a micro base station; and the user equipment has only an uplink single transmission capability. Because the user equipment has only the uplink single transmission capability, in one subframe, the user equipment can perform uplink transmission in only one serving cell, and therefore, the user equipment needs to operate across different serving cells in a time division multiplexing manner. Therefore, for each serving cell, in one radio frame, only some subframes are used for uplink transmission. In addition, because between the first serving cell and the second serving cell is the non-ideal backhaul route, HARQ-ACKs corresponding to serving cells can be transmitted only on the respective corresponding serving cells, and therefore, on each serving cell, some downlink subframes in one radio frame do not have corresponding uplink subframes for feeding back HARQ-ACK responses; consequently, these downlink subframes cannot be invoked, and the utilization of system resources is significantly decreased. By means of the foregoing implementation manner, resource utilization can be improved, and complexity of the user equipment is reduced. Specific analysis is described above, and details are not described herein again.

Further optionally, the uplink subframe n may be subframe C, subframe D, subframe E, and subframe F, where subframe C is a subframe prior to subframe D, subframe E is a subframe prior to subframe F, a difference between subframe numbers of subframe C and subframe E is 5, a correspondence between the downlink subframe set N and subframe C or subframe E is N={n−7, n−6, n−5}, and a correspondence between the downlink subframe set N and subframe D or subframe E is N={n−5, n−4}.

Specifically, it may be that: the uplink subframe n is subframe 0, subframe 1, subframe 5, and subframe 6 in a radio frame, where when the uplink subframe n is subframe 0 and subframe 5 in the radio frame, the set K includes elements 7, 6, and 5, for example, the set K is {7, 6, 5}, and when the uplink subframe n is subframe 1 and subframe 6 in the radio frame, the set K includes elements 5 and 4, for example, the set K is {5, 4}. It should be noted that, the uplink subframe n being subframe 0, subframe 1, subframe 5, and subframe 6 in a radio frame herein may refer to that the uplink subframe n is subframe 0, subframe 1, subframe 5, and subframe 6 in each radio frame, or may refer to that the uplink subframe n corresponds to the first subframe, the second subframe, the sixth subframe, and the seventh subframe in each radio frame. In this case, in subframe 0, subframe 1, subframe 5, and subframe 6 in each radio frame, an HARQ-ACK can be transmitted, and subframe 0, subframe 1, subframe 5, and subframe 6 each have a corresponding downlink subframe set.

Further optionally, if serving cells corresponding to the user equipment include a first serving cell and a second serving cell, and if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, for example, the set K is {7, 6, 5}, and when the uplink subframe n is subframe 1 and subframe 6 in the radio frame, the set K includes elements 5 and 4, for example, the set K is {5, 4}; or if the PDSCH transmission or the downlink control channel indicating downlink SPS release corresponds to the second serving cell, the uplink subframe n is subframe 2 and subframe 7 in a radio frame, and the set K includes elements 8, 7, 6, and 4, for example, the set K is {8, 7, 4, 6}, where the first serving cell and the second serving cell are both serving cells corresponding to the user equipment, a duplexing manner of the first serving cell is FDD, and a duplexing manner of the second serving cell is TDD. An uplink-downlink configuration or a reference uplink-downlink configuration of the second serving cell may be any one of uplink-downlink configurations 0 to 6, or an uplink-downlink configuration or a reference uplink-downlink configuration of the second serving cell may be any one of an uplink-downlink configuration 0, an uplink-downlink configuration 1, an uplink-downlink configuration 2, and an uplink-downlink configuration 6. In subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

That in subframe 0, subframe 1, subframe 5, and subframe 6 in the radio frame, the user equipment performs information transmission in the first serving cell may refer to that in subframe 0, subframe 1, subframe 5, and subframe 6 in the radio frame, the user equipment can perform information transmission only in the first serving cell. That in subframe 2 and subframe 7 in the radio frame, the user equipment performs information transmission in the second serving cell may refer to that in subframe 2 and subframe 7 in the radio frame, the user equipment can perform information transmission only in the second serving cell. That in subframe 3, subframe 4, subframe 8, and subframe 9 in the radio frame, the user equipment performs information transmission in the first serving cell or the second serving cell may refer to that in subframe 3, subframe 4, subframe 8, and subframe 9 in the radio frame, the user equipment may perform information transmission in the first serving cell or the second serving cell, and specifically, it may be determined, semi-statically according to higher layer signaling, whether to perform information transmission in the first serving cell or on the second serving cell, or it may be determined, dynamically according to physical layer signaling, whether to perform information transmission in the first serving cell or on the second serving cell. For user equipment that has a single uplink transmission capability and a dual downlink receiving capability in one subframe, in this implementation manner, that the user equipment performs information transmission in the first serving cell is preferably that the user equipment sends information on the first serving cell; in this implementation manner, that the user equipment performs information transmission in the second serving cell is preferably that the user equipment sends information on the second serving cell; and in this implementation manner, that the user equipment performs information transmission in the first serving cell or the second serving cell is preferably that the user equipment sends information on the first serving cell or the second serving cell. In this case, the user equipment that has the single uplink transmission capability and the dual downlink receiving capability in one subframe can receive information on the first serving cell and the second serving cell simultaneously.

Optionally, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where 'D' represents a downlink subframe, 'U' represents an uplink subframe, and 'S' represents a special subframe, where the special subframe is also mainly used for downlink transmission.

Figure 3:
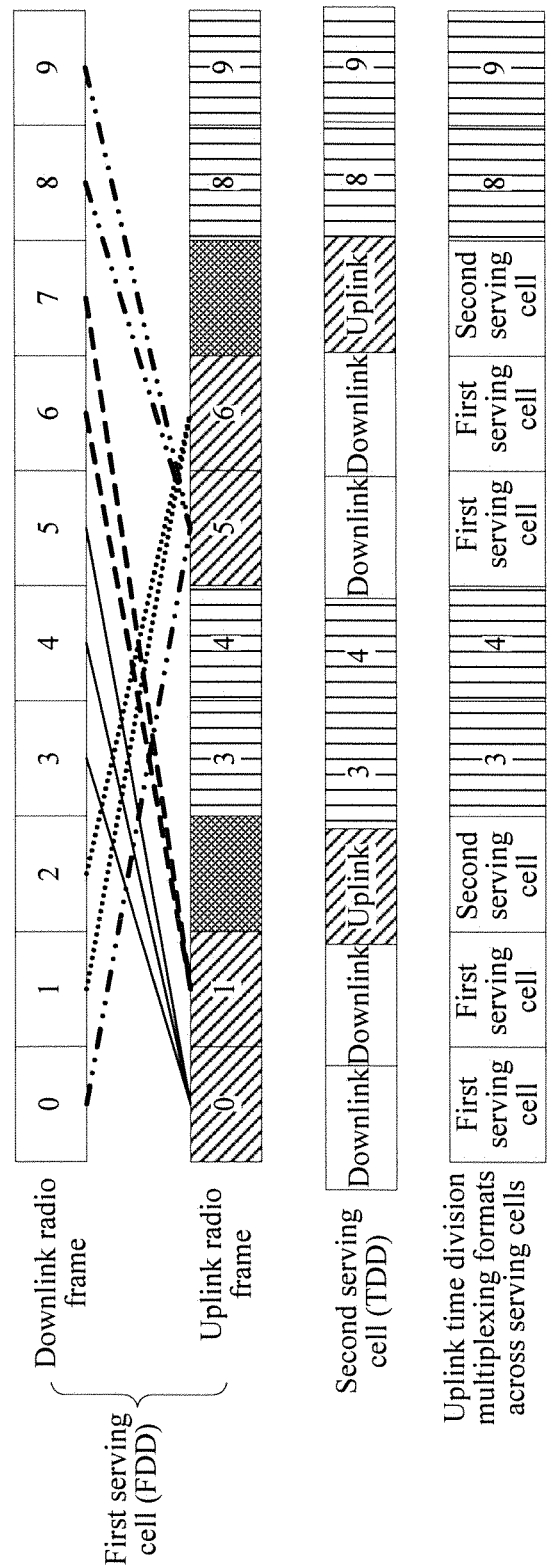
FIG. 3 is a schematic diagram of Embodiment 3 of an information transmission method according to the present invention.

FIG. 3 is a schematic diagram of Embodiment 3 of an information transmission method according to the present invention. As shown in FIG. 3, serving cells corresponding to user equipment include a first serving cell and a second serving cell, a duplexing manner corresponding to the first serving cell is frequency division duplex FDD, and a duplexing manner corresponding to the second serving cell is time division duplex TDD. An uplink-downlink configuration of the second serving cell is any one of uplink-downlink configurations 0 to 6, or a reference uplink-downlink configuration of the second serving cell is any one of uplink-downlink configurations 0 to 6, or an uplink-downlink configuration or a reference uplink-downlink configuration of the second serving cell may be any one of an uplink-downlink configuration 0, an uplink-downlink configuration 1, an uplink-downlink configuration 2, and an uplink-downlink configuration 6.

Specifically, if the PDSCH transmission or the downlink control channel indicating downlink SPS release received in S110 in FIG. 1 corresponds to the first serving cell, the uplink subframe n in S120 corresponds to subframe 0, subframe 1, subframe 5, and subframe 6 in a radio frame, where when the uplink subframe n corresponds to subframe 0 and subframe 5 in the radio frame, the set K is {7, 6, 5}, and when the uplink subframe n corresponds to subframe 1 and subframe 6 in the radio frame, the set K is {5, 4}.

If the PDSCH transmission or the downlink control channel indicating downlink SPS release received in S110 in FIG. 1 corresponds to the second serving cell, the uplink subframe n corresponds to subframe 2 and subframe 7 in a radio frame, and the set K is {8, 7, 6, 4}.

According to the set K, in each uplink subframe in which an HARQ-ACK response can be transmitted, downlink subframes, of which HARQ-ACK responses need to be fed back, can be determined; or an uplink subframe, in which an HARQ-ACK response for PDSCH transmission or a downlink control channel indicating downlink SPS release is fed back, is known, where the PDSCH transmission or the downlink control channel indicating downlink SPS release is received in one downlink subframe. For example, in this implementation manner, when the uplink subframe n corresponds to subframe 0 in a radio frame, HARQ-ACK responses of downlink subframes n−7, n−6, and n−5 need to be fed back in the uplink subframe n. In this implementation manner, in uplink subframe 0, uplink subframe 1, uplink subframe 5, and uplink subframe 6 in a radio frame, an HARQ-ACK response can be transmitted; in uplink subframe 0 in a radio frame, HARQ-ACK responses of downlink subframe 3, downlink subframe 4, and downlink subframe 5 in a radio frame are fed back; in uplink subframe 1 in a radio frame, HARQ-ACK responses of downlink subframe 6 and downlink subframe 7 in a radio frame are fed back; in uplink subframe 5 in a radio frame, HARQ-ACK responses of downlink subframe 8, downlink subframe 9, and downlink subframe 0 in a radio frame are fed back; in uplink subframe 6 in a radio frame, HARQ-ACK responses of downlink subframe 1 and downlink subframe 2 in a radio frame are fed back. The "a radio frame" mentioned herein is not intended to limit that the mentioned uplink subframes and downlink subframes are in one radio frame, but it is intended to limit that what is mentioned is subframe sequence numbers of subframes in a radio frame, for example, in uplink subframe 0 in a radio frame, HARQ-ACK responses of downlink subframe 3, downlink subframe 4, and downlink subframe 5 in a previous radio frame are fed back. The "a radio frame" herein may refer to each radio frame in multiple radio frames.

It should be noted that, in this scenario, HARQ-ACK timing of the second serving cell may also be other timing, for example, may be hybrid automatic repeat request-acknowledgment timing corresponding to the uplink-downlink configuration of the second serving cell or HARQ-ACK timing corresponding to the reference uplink-downlink configuration of the second serving cell. In this case, the uplink subframe n is determined according to the HARQ-ACK timing corresponding to the uplink-downlink configuration of the second serving cell or the HARQ-ACK timing corresponding to the reference uplink-downlink configuration of the second serving cell.

In this case, in subframe 0, subframe 1, subframe 5, and subframe 6 in the radio frame, the user equipment needs to transmit, on the first serving cell, an HARQ-ACK response of the first serving cell; and in subframe 2 and subframe 7 in the radio frame, the user equipment needs to transmit, on the second serving cell, an HARQ-ACK response of the second serving cell. Therefore, in these subframes, the user equipment needs to operate on corresponding serving cells, while in other subframes, the user equipment may operate on any one of all serving cells. Therefore, in this case, time division multiplexing manners of the user equipment in the configured serving cells are as follows:

In subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

In the foregoing implementation manner, in one aspect, hybrid automatic repeat request-acknowledgment timing of an FDD serving cell is designed to resolve a problem that some downlink subframes on the FDD serving cell do not have corresponding uplink subframes for feeding back HARQ-ACK responses, so that a base station can also send information to user equipment in these downlink subframes, thereby improving recourse utilization. In another aspect, it is limited that in subframe 0, subframe 1, subframe 5, and subframe 6 in a radio frame, the user equipment operates on a first serving cell, so that no matter the user equipment operates across different serving cells in which time division multiplexing manner, there is only one set of HARQ-ACK timing, thereby reducing complexity of the user equipment. In another aspect, it is limited that, in subframe 0, subframe 1, subframe 5, and subframe 6 in a radio frame, the user equipment operates on the first serving cell, and because a duplexing manner of a second serving cell is TDD, in subframe 0, subframe 1, subframe 5, and subframe 6, the second serving cell corresponds to downlink subframes, and therefore, the user equipment cannot perform uplink transmission in the second serving cell; when it is limited that HARQ-ACKs of the first serving cell are fed back on these subframes, uplink time division multiplexing manners of the user equipment in the first serving cell and the second serving cell may not be limited, so that a system can configure a user equipment to operate on the first serving cell or the second serving cell according to an actual service requirement. In addition, when timing of the second serving cell is limited to subframe 2 and subframe 7 in a radio frame, no matter which of uplink-downlink configurations 0, 1, 2, and 6 is used as an uplink-downlink configuration or a reference uplink-downlink configuration of the second serving cell, the user equipment has only one set of HARQ-ACK timing, which reduces complexity of the user equipment, and reduces limitations on a time division multiplexing mechanism of the user equipment across different cells.

The foregoing implementation manner may be specifically applied to the scenario shown in FIG. 3, but the application is not limited to this scenario: Serving cells corresponding to user equipment include a first serving cell and a second serving cell; a duplexing manner corresponding to the first serving cell is frequency division duplex FDD, and a duplexing manner of the second serving cell is time division duplex TDD; between the first serving cell and the second serving cell is a non-ideal backhaul route; a base station corresponding to the first serving cell may be a macro base station, and a base station corresponding to the second serving cell may be a micro base station; and the user equipment has only an uplink single transmission capability. Because the user equipment has only the uplink single transmission capability, in one subframe, the user equipment can perform uplink transmission in only one serving cell, and therefore, the user equipment needs to operate across different serving cells in a time division multiplexing manner. Therefore, for each serving cell, in one radio frame, only some subframes are used for uplink transmission. In addition, because between the first serving cell and the second serving cell is the non-ideal backhaul route, HARQ-ACKs corresponding to serving cells can be transmitted only on the respective corresponding serving cells, and therefore, on each serving cell, some downlink subframes in one radio frame do not have corresponding uplink subframes for feeding back HARQ-ACK responses; consequently, these downlink subframes cannot be invoked, and the utilization of system resources is significantly decreased. By means of the foregoing implementation manner, resource utilization can be improved, and complexity of the user equipment is reduced. Specific analysis is described above, and details are not described herein again.

The information transmission method provided by this embodiment of the present invention is not limited to the foregoing implementation manner or application scenario, nor limited to the foregoing combined implementation manners, for example, the following implementation manners may also be used:

Manner A: the uplink subframe n is subframe 2, subframe 3, subframe 7, and subframe 8 in a radio frame, where when the uplink subframe n is subframe 2 and subframe 7 in the radio frame, the set K is {7, 6, 5}, and when the uplink subframe n is subframe 3 and subframe 8 in the radio frame, the set K is {5, 4}. When the uplink subframe n is subframe 2 and subframe 7 in the radio frame, in the uplink subframe n, HARQ-ACK responses of downlink subframes n−7, n−6 and n−5 are fed back; and when the uplink subframe n is subframe 3 and subframe 8 in the radio frame, in the uplink subframe n, HARQ-ACK responses of downlink subframes n−5 and n−4 are fed back.

The manner A may be combined with the HARQ-ACK timing of the first serving cell shown in FIG. 3. In this case, if serving cells corresponding to the user equipment include a first serving cell and a second serving cell, and if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, for example, the set K is {7, 6, 5}, and when the uplink subframe n is subframe 1 and subframe 6 in the radio frame, the set K includes elements 5 and 4, for example, the set K is {5, 4}; or if the PDSCH transmission or the downlink control channel indicating downlink SPS release corresponds to the second serving cell, the uplink subframe n is subframe 2, subframe 3, subframe 7, and subframe 8 in a radio frame, where when the uplink subframe n is subframe 2 and subframe 7 in the radio frame, the set K is {7, 6, 5}, and when the uplink subframe n is subframe 3 and subframe 8 in the radio frame, the set K is {5, 4}. The first serving cell and the second serving cell are both serving cells corresponding to the user equipment.

Manner B: if the PDSCH transmission or the downlink control channel indicating downlink SPS release received in S110 in FIG. 1 corresponds to the first serving cell, the uplink subframe n in S120 is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}.

If the PDSCH transmission or the downlink control channel indicating downlink SPS release received in S110 in FIG. 1 corresponds to the second serving cell, the uplink subframe n in S120 is subframe 2, subframe 3, subframe 7, and subframe 8 in a radio frame, where when the uplink subframe n is subframe 2 and subframe 7 in the radio frame, the set K is {7, 6, 5}, and when the uplink subframe n is subframe 3 and subframe 8 in the radio frame, the set K is {5, 4}.

In this case, time division multiplexing manners of the user equipment in the configured serving cells are as follows:

In subframe 0, subframe 1, subframe 5, and subframe 6 in the radio frame, the user equipment performs information transmission in the first serving cell; in subframe 2, subframe 3, subframe 7, and subframe 8 in the radio frame, the user equipment performs information transmission in the second serving cell; and in subframe 4 and subframe 9 in the radio frame, the user equipment performs information transmission in the first serving cell or the second serving cell.

The manner B corresponds to the implementation manner shown in FIG. 2, and because more subframes are used for feeding back HARQ-ACK responses, an HARQ-ACK response feedback delay is reduced.

Manner C: if serving cells corresponding to the user equipment include a first serving cell and a second serving cell, S110 in FIG. 1 may include: in a downlink subframe set N1, detecting, by the user equipment in the first serving cell, physical downlink shared channel PDSCH transmission or a downlink control channel indicating downlink semi-persistent scheduling SPS release; and in a downlink subframe set N2, detecting, by the user equipment in the second serving cell, physical downlink shared channel PDSCH transmission or a downlink control channel indicating downlink semi-persistent scheduling SPS release; and S120 in FIG. 1 may include: sending, by the user equipment in an uplink subframe n1 corresponding to the downlink subframe set N1, a hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the first serving cell, and/or sending, by the user equipment in an uplink subframe n2 corresponding to the downlink subframe set N2, a hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the second serving cell, where n1 and n2 are subframe numbers, n1 and n2 are positive integers greater than or equal to 0, and n1≠n2. A correspondence between the downlink subframe set N1 and the uplink subframe n1 is N1={n1−$k_0$, n1−$k_1$, . . . , n1−$k_{M-1}$}, and a correspondence between the downlink subframe set N2 and the uplink subframe n2 is N2={n2−$p_0$, n2−$p_1$, . . . , n2−$p_{S-1}$}, where $k_0$, $k_1$, . . . , $k_{M-1}$ are positive integers and are elements in a set K, $p_0$, $p_1$, . . . , $p_{S-1}$ are positive integers and are elements in a set P, M is a quantity of elements included in the set K, and S is a quantity of elements included in the set P. The set K and the set P include same elements. The sending, by the user equipment in an uplink subframe n1 corresponding to the downlink subframe set N1, a hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the first serving cell may include: in the uplink subframe n1 corresponding to the downlink subframe set N1, sending, by the user equipment by using the first serving cell, the hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the first serving cell; and the sending, by the user equipment in an uplink subframe n2 corresponding to the downlink subframe set N2, a hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the second serving cell may include: in the uplink subframe n2 corresponding to the downlink subframe set N2, sending, by the user equipment to a base station by using the second serving cell, the hybrid automatic repeat request-acknowledgment response that corresponds to the physical downlink shared channel PDSCH transmission or corresponds to the downlink control channel indicating downlink semi-persistent scheduling SPS release, where the physical downlink shared channel PDSCH transmission or the downlink control channel indicating downlink semi-persistent scheduling SPS release is detected on the second serving cell. The uplink subframe n1 may be subframe 0 and subframe 5 in a radio frame, and the set K includes 8, 7, 6, 5, and 4. The uplink subframe n2 may be subframe 1 and subframe 6 in a radio frame, and the set K includes 8, 7, 6, 5, and 4. Duplexing manners corresponding to the first serving cell and the second serving cell are both frequency division duplex FDD. The uplink subframe n1 may be subframe 0, subframe 1, subframe 5, and subframe 6 in a radio frame, where when the uplink subframe n1 is subframe 0 and subframe 5 in the radio frame, the set K includes 7, 6, and 5, and when uplink subframe n1 is subframe 1 and subframe 6 in the radio frame, the set K includes 5 and 4; the uplink subframe n2 may be subframe 2 and subframe 7 in a radio frame, and the set P includes 8, 7, 4, and 6. A duplexing manner of the first serving cell is frequency division duplex FDD, a duplexing manner of the second serving cell is time division duplex TDD, and an uplink-downlink configuration or a reference uplink-downlink configuration of the second serving cell may be any one of uplink-downlink configurations 0 to 6, or an uplink-downlink configuration or a reference uplink-downlink configuration of the second serving cell may be any one of an uplink-downlink configuration 0, an uplink-downlink configuration 1, an uplink-downlink configuration 2, and an uplink-downlink configuration 6.

In the information transmission method provided by this embodiment of the present invention, in one aspect, HARQ-ACK timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving resource utilization. In another aspect, it is limited that each serving cell has fixed HARQ-ACK timing, and it is limited that in some fixed subframes, the user equipment operates on a first serving cell and in some other fixed subframes, the user equipment operates on a second serving cell, while in other subframes, according to an actual situation, the user equipment may be configured to operate on the first serving cell or the second serving cell, so that subframe patterns of time division multiplexing of the user equipment across different cells are not limited; for different subframe patterns, each serving cell has only one set of HARQ-ACK timing, which further reduces complexity of the user equipment.

Figure 4:
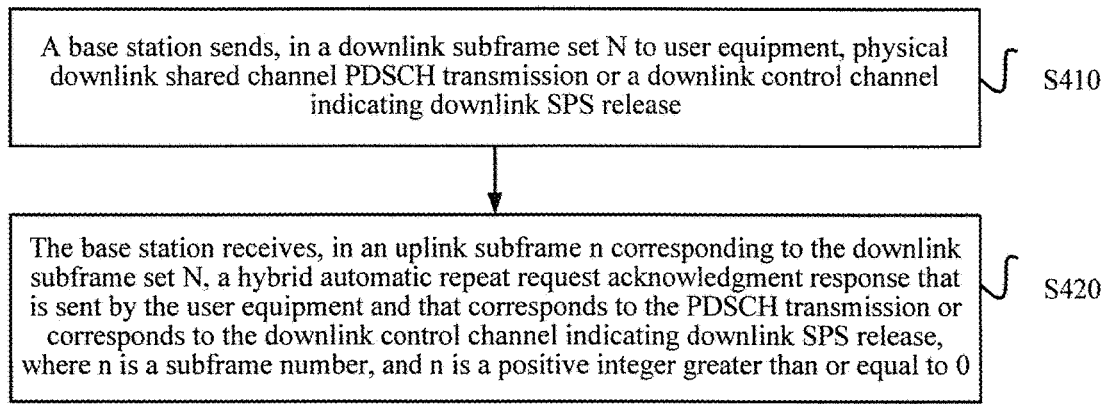
FIG. 4 is a flowchart of Embodiment 4 of an information transmission method according to the present invention.

FIG. 4 is a flowchart of Embodiment 4 of an information transmission method according to the present invention. As shown in FIG. 4, the information transmission method provided by this embodiment may include:

S410: A base station sends, in a downlink subframe set N to user equipment, physical downlink shared channel PDSCH transmission or a downlink control channel indicating downlink semi-persistent scheduling SPS release.

The downlink control channel in this embodiment may be a PDCCH or an EPDCCH. When the PDSCH transmission has a corresponding downlink control channel in a downlink subframe in which the PDSCH transmission is transmitted, this step may also be described as follows: the base station sends, in the downlink subframe set N, a downlink control channel to the user equipment, where the downlink control channel is a PDCCH or an enhanced physical downlink control channel (EPDCCH), and the downlink control channel is used for indicating PDSCH transmission or used for indicating downlink SPS release.

S420: The base station receives, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

According to an HARQ mechanism, the user equipment needs to feed back an HARQ-ACK response for the PDSCH transmission or for the downlink control channel indicating downlink SPS release, where the response is received in the downlink subframe set N. Therefore, the base station first needs to determine, according to predefined HARQ-ACK timing, an uplink subframe n in which the user equipment feeds back the HARQ-ACK response. Then, the base station receives, in the determined uplink subframe n, the HARQ-ACK response sent by the user equipment.

The subframe number refers to a number of a subframe in multiple radio frames, and may be obtained in the following manner: numbering, in chronological order, subframes in multiple radio frames in a monotonically increasing manner starting from 0, that is, if the last subframe of a previous radio frame is numbered n', the first subframe of a current radio frame is numbered n'+1. In addition, in multiple radio frames, each subframe also has a subframe sequence number in a radio frame in which the subframe is located, and this subframe sequence number is a subframe sequence number of this subframe in this radio frame. For example, if a subframe n is subframe 0 in a radio frame, it may refer to that a subframe sequence number of the subframe n is 0 in the radio frame in which the subframe n is located, or that the subframe n is the first subframe in the radio frame in which the subframe n is located, or that the subframe n corresponds to the first subframe in each radio frame.

In the information transmission method provided by this embodiment of the present invention, HARQ timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving the utilization of system resources.

Further, a correspondence between the downlink subframe set N and the uplink subframe n may be N={n-$k_0$, n-$k_1$, ..., n-$k_{M-1}$}, where $k_0$, $k_1$, ..., $k_{M-1}$, are positive integers and are elements in a set K, and M is a quantity of elements included in the set K; in other words, elements $k_0$, $k_1$, ..., $k_{M-1}$ belong to the set K, and the set K is a set {$k_0$, $k_1$, ..., $k_{M-1}$} including M elements.

Further optionally, if serving cells corresponding to the user equipment include a first serving cell and a second serving cell, the base station is a base station corresponding to the first serving cell, and the PDSCH transmission or the downlink control channel indicating downlink SPS release corresponds to the first serving cell, the receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release is: in an uplink subframe n corresponding to the downlink subframe set N, receiving, by the base station on the first serving cell, the hybrid automatic repeat request-acknowledgment response that is sent by the user equipment and that corresponds to the PDSCH transmission or corresponds to the downlink control channel indicating downlink SPS release. If the base station is a base station corresponding to the second serving cell, and the PDSCH transmission or the downlink control channel indicating downlink SPS release corresponds to the second serving cell, the receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release is: in an uplink subframe n corresponding to the downlink subframe set N, receiving, by the base station on the second serving cell, the hybrid automatic repeat request-acknowledgment response that is sent by the user equipment and that corresponds to the PDSCH transmission or corresponds to the downlink control channel indicating downlink semi-persistent scheduling SPS release.

Further optionally, before the receiving, by the base station in an uplink subframe n corresponding to the downlink subframe set N, a hybrid automatic repeat request-acknowledgment response that is sent by the base station and that corresponds to the PDSCH transmission or corresponds to the downlink control channel indicating downlink SPS release, the method further includes: sending, by the base station, higher layer signaling to the user equipment, where the higher layer signaling includes information indicating the correspondence between the downlink subframe set N and the uplink subframe n, or the higher layer signaling includes information indicating the uplink subframe n, and the uplink subframe n corresponds to a predefined downlink subframe set. For example, according to the indication of the higher layer signaling, the uplink subframe n may be subframe 0 and subframe 5 in a radio frame, or subframe 1 and subframe 6 in a radio frame, or subframe 2 and subframe 7 in a radio frame, or subframe 3 and subframe 8 in a radio frame, or subframe 4 and subframe 9 in a radio frame, and in this case, the predefined downlink subframe set may be N={n−8, n−7, n−6, n−5, n−4}. For another example, according to the indication of the higher layer signaling, the uplink subframe n is subframe 0, subframe 1, subframe 5 and subframe 6 in a radio frame, and in this case, the predefined downlink subframe set is as follows: when the uplink subframe n is subframe 0 and subframe 5 in the radio frame, the predefined downlink subframe set is N={n−7, n−6, n−5}, and when the uplink subframe n is subframe 1 and subframe 6 in the radio frame, the predefined downlink subframe set is N={n−5, n−4}. For another example, according to the indication of the higher layer signaling, the uplink subframe n is subframe 2, subframe 3, subframe 7 and subframe 8 in a radio frame, and in this case, the predefined downlink subframe set is as follows: when the uplink subframe n is subframe 2 and subframe 7 in the radio frame, the predefined downlink subframe set is N={n−7, n−6, n−5}, and when the uplink subframe n is subframe 3 and subframe 8 in the radio frame, the predefined downlink subframe set is N={n−5, n−4}.

Further optionally, the uplink subframe n may be subframe A and subframe B, a difference between subframe numbers of subframe A and subframe B is 5, and the set K includes elements 8, 7, 6, 5, and 4; in this case, the correspondence is N={n−8, n−7, n−6, n−5, n−4}.

Specifically, it may be that: the uplink subframe n is subframe 0 and subframe 5 in a radio frame, and the set K includes elements 8, 7, 6, 5, and 4, for example, the set K is {8, 7, 6, 5, 4}; or the uplink subframe n is subframe 1 and subframe 6 in a radio frame, and the set K includes elements 8, 7, 6, 5, and 4, for example, the set K is {8, 7, 6, 5, 4}. The interpretation about "the uplink subframe n is subframe 0 and subframe 5 in a radio frame" is the same as the related interpretation in the embodiment shown in FIG. 1, and details are not described herein again.

Further optionally, if serving cells corresponding to the user equipment include a first serving cell and a second serving cell, and if the base station is a base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is a base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD. In subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

In all the embodiments of the present invention, that a base station corresponds to a serving cell may refer to that the serving cell is controlled by the base station or the serving cell is deployed on the base station. That the base station performs information transmission with the user equipment may refer to that the base station sends information to the user equipment, or may also refer to that the base station receives information sent by the user equipment.

That in subframe 0 and subframe 5 in the radio frame, the base station corresponding to the first serving cell performs, on the first serving cell, information transmission with the user equipment may refer to that in subframe 0 and subframe 5 in the radio frame, only the base station corresponding to the first serving cell performs, on the first serving cell, information transmission with the user equipment. That in subframe 1 and subframe 6 in the radio frame, the base station corresponding to the second serving cell performs, on the second serving cell, information transmission with the user equipment may refer to that in subframe 1 and subframe 6 in the radio frame, only the base station corresponding to the second serving cell performs, on the second serving cell, information transmission with the user equipment. That in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment may refer to that in subframe 2, subframe 3, subframe 4, subframe 7, subframe 8, and subframe 9 in the radio frame, the base station corresponding to the first serving cell may perform, on the first serving cell, information transmission with the user equipment, or the base station corresponding to the second serving cell may perform, on the second serving cell, information transmission with the user equipment; specifically, a network side (which, for example, may be a base station) may determine whether the base station corresponding to the first serving cell performs, on the first serving cell, information transmission with the user equipment, or the base station corresponding to the second serving cell performs, on the second serving cell, information transmission with the user equipment, and meanwhile, the network side may notify the user equipment by using higher layer signaling or physical layer signaling.

In this case, a specific implementation manner and an effect are similar to those of the embodiments in FIG. 1 and FIG. 2, and details are not described herein again.

Further optionally, the uplink subframe n is subframe C, subframe D, subframe E, and subframe F, where subframe C is a subframe prior to subframe D, subframe E is a subframe prior to subframe F, a difference between subframe numbers of subframe C and subframe E is 5, a correspondence between the downlink subframe set N and subframe C or subframe E is N={n−7, n−6, n−5}, and a correspondence between the downlink subframe set N and subframe D or subframe E is N={n−5, n−4}.

Specifically, it may be that: the uplink subframe n is subframe 0, subframe 1, subframe 5, and subframe 6 in a radio frame, where when the uplink subframe n is subframe 0 and subframe 5 in the radio frame, the set K includes elements 7, 6, and 5, for example, the set K is {7, 6, 5}, and when the uplink subframe n is subframe 1 and subframe 6 in the radio frame, the set K includes elements 5 and 4, for example, the set K is {5, 4}.

Further optionally, if serving cells corresponding to the user equipment include a first serving cell and a second serving cell, and if the base station is a base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the base station is a base station corresponding to the second serving cell, and the PDSCH transmission or the downlink control channel indicating downlink SPS release corresponds to the second serving cell, the uplink subframe n is subframe 2 and subframe 7 in the radio frame, and the set K is {8, 7, 4, 6}, where the first serving cell and the second serving cell are both serving cells corresponding to the user equipment, a duplexing manner of the first serving cell is frequency division duplex FDD, a duplexing manner of the second serving cell is time division duplex TDD, and an uplink-downlink configuration or a reference uplink-downlink configuration of the base station corresponding to the second serving cell may be any one of uplink-downlink configurations 0 to 6, or an uplink-downlink configuration or a reference uplink-downlink configuration of the second serving cell may be any one of an uplink-downlink configuration 0, an uplink-downlink configuration 1, an uplink-downlink configuration 2, and an uplink-downlink configuration 6. In subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

That in subframe 0, subframe 1, subframe 5, and subframe 6 in the radio frame, the base station corresponding to the first serving cell performs, on the first serving cell, information transmission with the user equipment may refer to that in subframe 0, subframe 1, subframe 5, and subframe 6 in the radio frame, only the base station corresponding to the first serving cell performs, on the first serving cell, information transmission with the user equipment. That in subframe 2 and subframe 7 in the radio frame, the base station corresponding to the second serving cell performs, on the second serving cell, information transmission with the user equipment may refer to that in subframe 2 and subframe 7 in the radio frame, only the base station corresponding to the second serving cell performs, on the second serving cell, information transmission with the user equipment. That in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment may refer to that in subframe 3, subframe 4, subframe 8, and subframe 9 in the radio frame, the base station corresponding to the first serving cell may perform, on the first serving cell, information transmission with the user equipment, or the base station corresponding to the second serving cell may perform, on the second serving cell, information transmission with the user equipment; specifically, a network side (which, for example, may be a base station) may determine whether the base station corresponding to the first serving cell performs, on the first serving cell, information transmission with the user equipment, or the base station corresponding to the second serving cell performs, on the second serving cell, information transmission with the user equipment, and meanwhile, the network side may notify the user equipment by using higher layer signaling or physical layer signaling. For user equipment that has a single uplink transmission capability and a dual downlink receiving capability in one subframe, in this implementation manner, that the base station corresponding to the first serving cell performs, on the first serving cell, information transmission with the user equipment is preferably that the base station corresponding to the first serving cell receives, on the first serving cell, information sent by the user equipment; in this implementation manner, that the base station corresponding to the second serving cell performs, on the second serving cell, information transmission with the user equipment is preferably that the base station corresponding to the second serving cell receives, on the second serving cell, information sent by the user equipment; in this implementation manner, that the base station corresponding to the first serving cell performs, on the first serving cell, information transmission with the user equipment, or the base station corresponding to the second serving cell performs, on the second serving cell, information transmission with the user equipment is preferably that the base station corresponding to the first serving cell receives, on the first serving cell, information sent by the user equipment, or the base station corresponding to the second serving cell receives, on the second serving cell, information sent by the user equipment. In this case, in each downlink subframe, when the base station corresponding to the first serving cell sends, on the first serving cell, information to the user equipment that has the single uplink transmission capability and the dual downlink receiving capability in one subframe, the base station corresponding to the second serving cell may send, on the second serving cell, information to the user equipment that has the single uplink transmission capability and the dual downlink receiving capability in one subframe.

If the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D represents a downlink subframe, U represents an uplink subframe, and S represents a special subframe, where the special subframe is also mainly used for downlink transmission.

In this case, a specific implementation manner and an effect are similar to those of the embodiment in FIG. 3, and details are not described herein again.

The information transmission method provided by this embodiment of the present invention may also be applied in a scenario in which an execution body is a base station, and is not limited to the foregoing implementation manner or application scenario, nor limited to the foregoing combined implementation manners, for example, other implementation manners similar to the manner A, manner B, and manner C described above may also be used. For example, when the implementation manner A is used, it may be specifically:

If serving cells corresponding to the user equipment include a first serving cell and a second serving cell, and if the base station is a base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, for example, the set K is {7, 6, 5}, and when the uplink subframe n is subframe 1 and subframe 6 in the radio frame, the set K includes elements 5 and 4, for example, the set K is {5, 4}; or if the base station is a base station corresponding to the second serving cell, and the PDSCH transmission or the downlink control channel indicating downlink SPS release corresponds to the second serving cell, the uplink subframe n is subframe 2, subframe 3, subframe 7, and subframe 8 in a radio frame, where when the uplink subframe n is subframe 2 and subframe 7 in the radio frame, the set K is {7, 6, 5}, and when the uplink subframe n is subframe 3 and subframe 8 in the radio frame, the set K is {5, 4}. The first serving cell and the second serving cell are both serving cells corresponding to the user equipment. This implementation manner can further reduce an HARQ-ACK feedback delay.

A scenario in which the base station is an execution body and the implementation manner B or implementation manner C is used is not described in detail herein again.

In the information transmission method provided by this embodiment of the present invention, in one aspect, HARQ-ACK timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving resource utilization. In another aspect, it is limited that each serving cell has fixed HARQ-ACK timing, and it is limited that in some fixed subframes, the user equipment operates on a first serving cell and in some other fixed subframes, the user equipment operates on a second serving cell, while in other subframes, according to an actual situation, the user equipment may be configured to operate on the first serving cell or the second serving cell, so that subframe patterns of time division multiplexing of the user equipment across different cells are not limited; for different subframe patterns, each serving cell has only one set of HARQ-ACK timing, which further reduces complexity of the user equipment.

Figure 5:
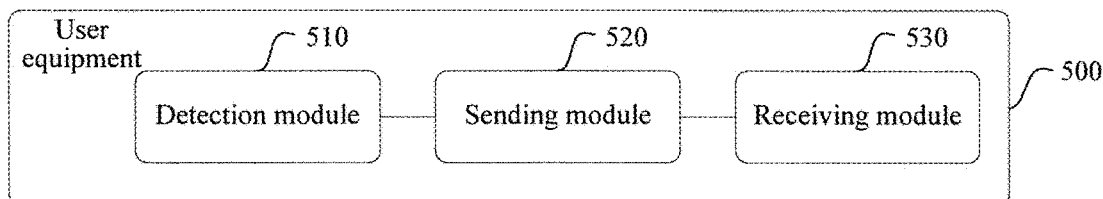
FIG. 5 is a schematic structural diagram of Embodiment 1 of user equipment according to the present invention.

FIG. 5 is a schematic structural diagram of Embodiment 1 of user equipment according to the present invention. As shown in FIG. 5, user equipment 500 provided by this embodiment may include: a detection module 510, a sending module 520, and a receiving module 530.

The detection module 510 is configured to detect, in a downlink subframe set N, physical downlink shared channel PDSCH transmission or a downlink control channel indicating downlink semi-persistent scheduling SPS release.

The sending module 520 is configured to send, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number, and n is an integer greater than or equal to 0.

The user equipment 500 provided by this embodiment may be configured to perform the technical solution of the method embodiment shown in FIG. 1, and has a similar implementation principle and technical effect. Details are not described herein again.

Further, a correspondence between the downlink subframe set N and the uplink subframe n is N={n-$k_0$, n-$k_1$, ..., n-$k_{M-1}$}, where $k_0$, $k_1$, ..., $k_{M-1}$ are positive integers and are elements in a set K, and M is a quantity of elements included in the set K.

Further, if the PDSCH transmission or the downlink control channel indicating downlink SPS release corresponds to a first serving cell, the sending module 520 is configured to: in the uplink subframe n corresponding to the downlink subframe set N, send, on the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to a second serving cell, the sending module 520 is configured to: in the uplink subframe n corresponding to the downlink subframe set N, send, on the second serving cell, the hybrid automatic repeat request-acknowledgment response that corresponds to the PDSCH transmission or corresponds to the downlink control channel indicating downlink SPS release, where the first serving cell and the second serving cell are both serving cells corresponding to the user equipment.

Further, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

Further, if the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where both the first serving cell and the second serving cell are serving cells corresponding to the user equipment, and duplexing manners corresponding to the first serving cell and the second serving cell are both frequency division duplex FDD.

Further, in subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

Further, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

Further, if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the PDSCH transmission or the downlink control channel indicating downlink SPS release corresponds to a second serving cell, the uplink subframe n is subframe 2 and subframe 7 in a radio frame, and the set K is {8, 7, 4, 6}, where the first serving cell and the second serving cell are both serving cells of the user equipment, a duplexing manner of the first serving cell is frequency division duplex FDD, and a duplexing manner of the second serving cell is time division duplex TDD.

Further, in subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

Further, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

Further, the receiving module 530 is configured to receive higher layer signaling sent by a base station, where the higher layer signaling includes information indicating the uplink subframe n and indicating the correspondence between the downlink subframe set N and the uplink subframe n.

The user equipment 500 provided by this embodiment may be configured to perform the technical solution of the method embodiment shown in any one of FIG. 1 to FIG. 3, and has a similar implementation principle and technical effect. Details are not described herein again.

Figure 6:
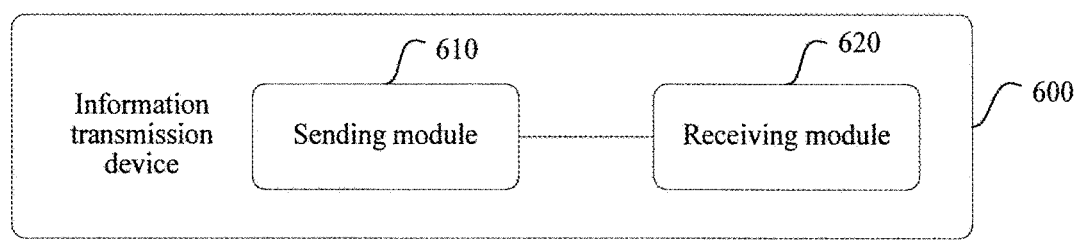
FIG. 6 is a schematic structural diagram of Embodiment 1 of an information transmission device according to the present invention.

FIG. 6 is a schematic structural diagram of Embodiment 1 of an information transmission device according to the present invention. As shown in FIG. 6, an information transmission device 600 provided by this embodiment may be a base station, and includes: a sending module 610 and a receiving module 620.

The sending module 610 is configured to send, in a downlink subframe set N to user equipment, physical downlink shared channel PDSCH transmission or a downlink control channel indicating downlink semi-persistent scheduling SPS release.

The receiving module 620 is configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

The information transmission device 600 provided by this embodiment may be configured to perform the technical solution of the method embodiment shown in FIG. 4, and has a similar implementation principle and technical effect. Details are not described herein again.

Further, a correspondence between the downlink subframe set N and the uplink subframe n is N={n−k$_0$, n−k$_1$, . . . , n−k$_{M-1}$}, where k$_0$, k$_1$, . . . , k$_{M-1}$ are positive integers and are elements in a set K, and M is a quantity of elements included in the set K.

Further, if the base station is a base station corresponding to a first serving cell, and the PDSCH transmission or the downlink control channel indicating downlink SPS release corresponds to the first serving cell, the receiving module 620 is configured to: in the uplink subframe n corresponding to the downlink subframe set N, receive, on the first serving cell, the hybrid automatic repeat request-acknowledgment response that is sent by the user equipment and that corresponds to the PDSCH transmission or corresponds to the downlink control channel indicating downlink SPS release; or if the base station is a base station corresponding to a second serving cell, and the PDSCH transmission or the downlink control channel indicating downlink SPS release corresponds to the second serving cell, the receiving module 620 is configured to: in the uplink subframe n corresponding to the downlink subframe set N, receive, on the second serving cell, the hybrid automatic repeat request-acknowledgment response that is sent by the user equipment and that corresponds to the PDSCH transmission or corresponds to the downlink control channel indicating downlink semi-persistent scheduling SPS release, where the first serving cell and the second serving cell are both serving cells corresponding to the user equipment.

Further, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

Further, if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

Further, in subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

Further, the uplink subframe n is subframe 0, subframe 1, subframe 5, and subframe 6 in a radio frame, where when the uplink subframe n is subframe 0 and subframe 5 in the radio frame, the set K includes elements 7, 6, and 5; and when the uplink subframe n is subframe 1 and subframe 6 in the radio frame, the set K includes elements 5 and 4.

Further, if the base station is the base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the base station is the base station corresponding to the second serving cell, and the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

Further, in subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

Further, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

Further, the sending module 610 is further configured to send higher layer signaling to the user equipment, where the higher layer signaling includes information indicating the uplink subframe n and indicating the correspondence between the downlink subframe set N and the uplink subframe n.

The information transmission device 600 provided by this embodiment may be configured to perform the technical solution of any method embodiment shown in FIG. 2, FIG. 3 or FIG. 4, and has a similar implementation principle and technical effect. Details are not described herein again.

Figure 7:
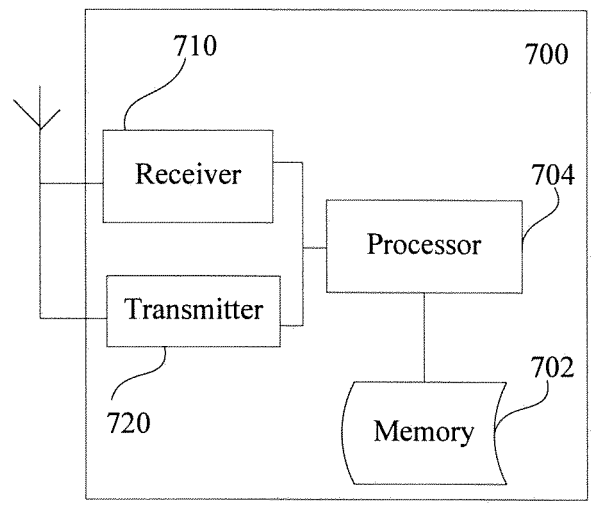
FIG. 7 is a schematic structural diagram of Embodiment 2 of user equipment according to the present invention.

FIG. 7 is a schematic structural diagram of Embodiment 2 of user equipment according to the present invention. As shown in FIG. 7, user equipment 700 provided by this embodiment may include: a receiver 710, a transmitter 720, a memory 702, and a processor 704 that is separately connected to the receiver 710, the transmitter 720, and the memory 702. Certainly, the user equipment 700 may further include universal components such as an antenna, which is not limited in this embodiment of the present invention.

The memory 702 has stored therein a group of program code, and the processor 704 is configured to invoke the program code stored in the memory 702, to perform the following operations:

the receiver 710 is configured to detect, in a downlink subframe set N, physical downlink shared channel PDSCH transmission or a downlink control channel indicating downlink semi-persistent scheduling SPS release; and the transmitter 720 is configured to send, in an uplink subframe n corresponding to the downlink subframe set N, a hybrid automatic repeat request-acknowledgment response that corresponds to the PDSCH transmission or corresponds to the downlink control channel indicating downlink SPS release, where n is a subframe number, and n is an integer greater than or equal to 0.

The user equipment 700 provided by this embodiment may be configured to perform the technical solution of the method embodiment shown in FIG. 1, and has a similar implementation principle and technical effect similar. Details are not described herein again.

Further, a correspondence between the downlink subframe set N and the uplink subframe n is N={n−k$_0$, n−k$_1$, ..., n−k$_{M-1}$}, where k$_0$, k$_1$, ..., k$_{M-1}$ are positive integers and are elements in a set K, and M is a quantity of elements included in the set K.

Further, if the PDSCH transmission or the downlink control channel indicating downlink SPS release corresponds to a first serving cell, the transmitter 720 is configured to: in the uplink subframe n corresponding to the downlink subframe set N, send, on the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to a second serving cell, the transmitter 720 is configured to: in the uplink subframe n corresponding to the downlink subframe set N, send, on the second serving cell, the hybrid automatic repeat request-acknowledgment response that corresponds to the PDSCH transmission or corresponds to the downlink control channel indicating downlink SPS release, where the first serving cell and the second serving cell are both serving cells corresponding to the user equipment.

Further, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

Further, if the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where both the first serving cell and the second serving cell are serving cells corresponding to the user equipment, and duplexing manners corresponding to the first serving cell and the second serving cell are both frequency division duplex FDD.

Further, in subframe 0 and subframe 5 in the radio frame, the user equipment performs information transmission in the first serving cell; in subframe 1 and subframe 6 in the radio frame, the user equipment performs information transmission in the second serving cell; and in subframe 2, subframe 3, subframe 4, subframe 7, subframe 8, and subframe 9 in the radio frame, the user equipment performs information transmission in the first serving cell or the second serving cell.

Further, the uplink subframe n is subframe 0, subframe 1, subframe 5, and subframe 6 in a radio frame, where when the uplink subframe n is subframe 0 and subframe 5 in the radio frame, the set K includes elements 7, 6, and 5; and when the uplink subframe n is subframe 1 and subframe 6 in the radio frame, the set K includes elements 5 and 4.

Further, if the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set K is {5, 4}; or if the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells of the user equipment, a duplexing manner of the first serving cell is frequency division duplex FDD, and a duplexing manner of the second serving cell is time division duplex TDD.

Further, in subframe 0, subframe 1, subframe 5, and subframe 6 in the radio frame, the user equipment performs information transmission in the first serving cell; in subframe 2 and subframe 7 in the radio frame, the user equipment performs information transmission in the second serving cell; and in subframe 3, subframe 4, subframe 8, and subframe 9 in the radio frame, the user equipment performs information transmission in the first serving cell or the second serving cell.

Further, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | Subframe sequence number in a radio frame | | | | | | | | | |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

Further, the receiver 710 is further configured to receive higher layer signaling sent by a base station, where the higher layer signaling includes information indicating the uplink subframe n and indicating the correspondence between the downlink subframe set N and the uplink subframe n.

The user equipment 700 provided by this embodiment may be configured to perform the technical solution of the method embodiment shown in any one of FIG. 1 to FIG. 3, and has a similar implementation principle and technical effect. Details are not described herein again.

Figure 8:
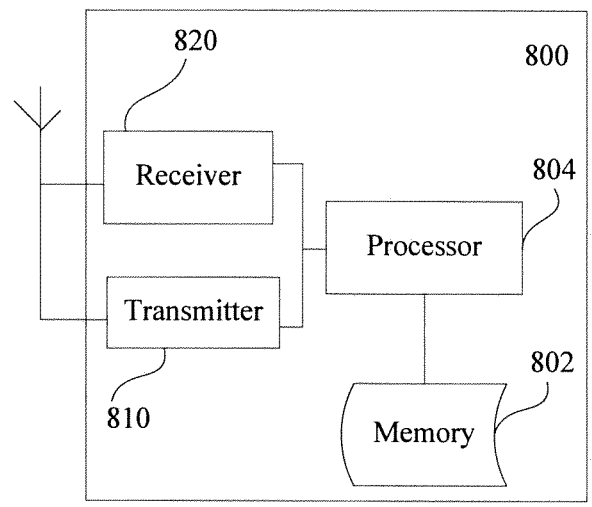
FIG. 8 is a schematic structural diagram of Embodiment 2 of an information transmission device according to the present invention.

FIG. 8 is a schematic structural diagram of Embodiment 2 of an information transmission device according to the present invention. As shown in FIG. 8, an information transmission device 800 provided by this embodiment may include: a transmitter 810, a receiver 820, a memory 802, and a processor 804 that is separately connected to the transmitter 810, the receiver 820, and the memory 802. Certainly, the information transmission device 800 may further include universal components such as an antenna, a baseband processing component, an intermediate radio frequency processing component, and an input/output apparatus, which is not limited in this embodiment of the present invention.

The memory 802 has stored therein a group of program code, and the processor 804 is configured to invoke the program code stored in the memory 802, to perform the following operations:

the transmitter 810 is configured to send, in a downlink subframe set N to user equipment, physical downlink shared channel PDSCH transmission or a downlink control channel indicating downlink semi-persistent scheduling SPS release; and the receiver 820 is configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, where n is a subframe number, and n is an integer greater than or equal to 0.

The information transmission device 800 provided by this embodiment may be configured to perform the technical solution of the method embodiment shown in FIG. 4, and has a similar implementation principle and technical effect similar. Details are not described herein again.

Further, a correspondence between the downlink subframe set N and the uplink subframe n is N={n−$k_0$, n−$k_1$, . . . , n−$k_{M-1}$}, where $k_0$, $k_1$, . . . , $k_{M-1}$ are positive integers and are elements in a set K, and M is a quantity of elements included in the set K.

Further, if the base station is a base station corresponding to a first serving cell, and the PDSCH transmission or the downlink control channel indicating downlink SPS release corresponds to the first serving cell, the receiver 820 is configured to: in the uplink subframe n corresponding to the downlink subframe set N, receive, on the first serving cell, the hybrid automatic repeat request-acknowledgment response that is sent by the user equipment and that corresponds to the PDSCH transmission or corresponds to the downlink control channel indicating downlink SPS release; or if the base station is a base station corresponding to a second serving cell, and the PDSCH transmission or the downlink control channel indicating downlink SPS release corresponds to the second serving cell, the receiver 820 is configured to: in the uplink subframe n corresponding to the downlink subframe set N, receive, on the second serving cell, the hybrid automatic repeat request-acknowledgment response that is sent by the user equipment and that corresponds to the PDSCH transmission or corresponds to the downlink control channel indicating downlink semi-persistent scheduling SPS release, where the first serving cell and the second serving cell are both serving cells corresponding to the user equipment.

Further, the uplink subframe n is subframe 0 and subframe 5 in a radio frame, and the set K includes elements 8, 7, 6, 5, and 4; or the uplink subframe n is subframe 1 and subframe 6 in a radio frame, and the set K includes elements 8, 7, 6, 5, and 4.

Further, if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is {8, 7, 6, 5, 4}, where the first serving cell and the second serving cell are both serving cells corresponding to the user equipment, and duplexing manners corresponding to the first serving cell and the second serving cell are both frequency division duplex FDD.

Further, in subframe 0 and subframe 5 in the radio frame, the base station corresponding to the first serving cell performs, on the first serving cell, information transmission with the user equipment; in subframe 1 and subframe 6 in the radio frame, the base station corresponding to the second serving cell performs, on the second serving cell, information transmission with the user equipment; and in subframe 2, subframe 3, subframe 4, subframe 7, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

Further, the uplink subframe n is subframe 0, subframe 1, subframe 5, and subframe 6 in a radio frame, where when the uplink subframe n is subframe 0 and subframe 5 in the radio frame, the set K includes elements 7, 6, and 5, and when the uplink subframe n is subframe 1 and subframe 6 in the radio frame, the set K includes elements 5 and 4.

Further, if the base station is the base station corresponding to the first serving cell, and the PDSCH transmission or the downlink control channel indicating downlink SPS release corresponds to the first serving cell, the uplink subframe n is subframe 0, subframe 1, subframe 5, and subframe 6 in a radio frame, where when the uplink subframe n is subframe 0 and subframe 5 in the radio frame, the set K is {7, 6, 5}, and when the uplink subframe n is subframe 1 and subframe 6 in the radio frame, the set k is {5, 4}; or if the base station is the base station corresponding to the second serving cell, and the PDSCH transmission or the downlink control channel indicating downlink SPS release corresponds to the second serving cell, the uplink subframe n is subframe 2 and subframe 7 in a radio frame, and the set K is {8, 7, 4, 6}, where the first serving cell and the second serving cell are both serving cells corresponding to the user equipment, a duplexing manner corresponding to the first serving cell is frequency division duplex FDD, and a duplexing manner corresponding to the second serving cell is time division duplex TDD.

Further, in subframe 0, subframe 1, subframe 5, and subframe 6 in the radio frame, the base station corresponding to the first serving cell performs, on the first serving cell, information transmission with the user equipment; in subframe 2 and subframe 7 in the radio frame, the base station corresponding to the second serving cell performs, on the second serving cell, information transmission with the user equipment; and in subframe 3, subframe 4, subframe 8, and subframe 9 in the radio frame, the base station corresponding to the first serving cell performs, on the first serving cell, information transmission with the user equipment, or the base station corresponding to the second serving cell performs, on the second serving cell, information transmission with the user equipment.

Further, if the first serving cell and the second serving cell are both serving cells corresponding to the user equipment, a duplexing manner of the first serving cell is frequency division duplex FDD, and a duplexing manner of the second serving cell is time division duplex TDD, an uplink-downlink configuration or a reference uplink-downlink configuration of the second serving cell is any one of uplink-downlink configurations 0 to 6, or an uplink-downlink configuration or a reference uplink-downlink configuration of the second serving cell is any one of an uplink-downlink configuration 0, an uplink-downlink configuration 1, an uplink-downlink configuration 2, and an uplink-downlink configuration 6, and the uplink-downlink configurations 0 to 6 include:

| Uplink-downlink configuration | Repetition period | \multicolumn{10}{c}{Subframe sequence number in a radio frame} |
|---|---|---|---|---|---|---|---|---|---|---|---|
| | | 0 | 1 | 2 | 3 | 4 | 5 | 6 | 7 | 8 | 9 |
| 0 | 5 milliseconds | D | S | U | U | U | D | S | U | U | U |
| 1 | 5 milliseconds | D | S | U | U | D | D | S | U | U | D |
| 2 | 5 milliseconds | D | S | U | D | D | D | S | U | D | D |
| 3 | 10 milliseconds | D | S | U | U | U | D | D | D | D | D |
| 4 | 10 milliseconds | D | S | U | U | D | D | D | D | D | D |
| 5 | 10 milliseconds | D | S | U | D | D | D | D | D | D | D |
| 6 | 5 milliseconds | D | S | U | U | U | D | S | U | U | D | where D is a downlink subframe, U is an uplink subframe, and S is a special subframe.

Further, the transmitter 810 is further configured to send higher layer signaling to the user equipment, where the higher layer signaling includes information indicating the uplink subframe n and indicating the correspondence between the downlink subframe set N and the uplink subframe n.

The information transmission device 800 provided by this embodiment may be configured to perform the technical solution of any method embodiment shown in FIG. 2, FIG. 3 or FIG. 4, and has a similar implementation principle and technical effect. Details are not described herein again.

In conclusion, in the information transmission method and device provided by the embodiments of the present invention, in one aspect, HARQ-ACK timing of an FDD serving cell is designed to resolve a problem that some downlink subframes on the FDD serving cell do not have corresponding uplink subframes for feeding back HARQ-ACK responses, so that a base station can send information to user equipment in more downlink subframes, thereby improving resource utilization. In another aspect, it is limited that each serving cell has fixed HARQ-ACK timing, and it is limited that in some fixed subframes, the user equipment operates on a first serving cell and in some other fixed subframes, the user equipment operates on a second serving cell, while in other subframes, according to an actual situation, the user equipment may be configured to operate on the first serving cell or the second serving cell, so that subframe patterns of time division multiplexing of the user equipment across different cells are not limited; for different subframe patterns, each serving cell has only one set of HARQ-ACK timing, which further reduces complexity of the user equipment.

What is claimed is:

1. An information transmission method, comprising:
   detecting, by a user equipment in a downlink subframe set N, wherein N is a predefined set of subframe numbers in a radio frame, a physical downlink shared channel (PDSCH) transmission or a downlink control channel indicating downlink semi-persistent scheduling (SPS) release;
   sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;
   wherein a correspondence between the downlink subframe set N and the uplink subframe n is N={n-k$_0$, n-k$_1$, . . . , n-k$_{M-1}$}, wherein k$_0$, k$_1$, . . . , k$_{M-1}$ are positive integers and are elements in a set K, and M is a quantity of elements comprised in the set K; and
   wherein:
   serving cells corresponding to the user equipment include a first serving cell and a second serving cell, a duplexing manner corresponding to the first serving cell is frequency division duplex (FDD), and a duplexing manner corresponding to the second serving cell is time division duplex (TDD);
   the PDSCH transmission or the downlink control channel indicating downlink SPS release corresponds to the first serving cell, and
   the uplink subframe n is subframe 0, subframe 1, subframe 5, and subframe 6 in a radio frame, wherein:
   the set K comprises elements 7, 6 and 5 when the uplink subframe n is subframe 0 and subframe 5 in the radio frame, and the set K comprises elements 5 and 4 when the uplink subframe n is subframe 1 and subframe 6 in the radio frame.

2. The method according to claim 1, wherein:
if the PDSCH transmission or the downlink control channel indicating downlink SPS release corresponds to the first serving cell, sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release comprises:
in the uplink subframe n corresponding to the downlink subframe set N, sending, by the user equipment in the first serving cell, the hybrid automatic repeat request-acknowledgment response that corresponds to the PDSCH transmission or corresponds to the downlink control channel indicating downlink SPS release; or
if the PDSCH transmission or the downlink control channel indicating downlink SPS release corresponds to the second serving cell, sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release comprises:
in the uplink subframe n corresponding to the downlink subframe set N, sending, by the user equipment in the second serving cell, the hybrid automatic repeat request-acknowledgment response that corresponds to the PDSCH transmission or corresponds to the downlink control channel indicating downlink SPS release; and
wherein the first serving cell and the second serving cell are both serving cells corresponding to the user equipment.

3. An information transmission method, comprising:
detecting, by a user equipment in a downlink subframe set N, wherein N is a set of subframe numbers in a radio frame, a physical downlink shared channel (PDSCH) transmission or a downlink control channel indicating downlink semi-persistent scheduling (SPS) release; and
sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots n-k_{M-1}\}$, wherein $k_0, k_1, \ldots, k_{M-1}$ are positive integers and are elements in a set K, and M is a quantity of elements comprised in the set K; and
wherein:
the uplink subframe n is subframe 0 and subframe 5 in a radio frame, and the set K comprises elements 8, 7, 6, 5, and 4; or
the uplink subframe n is subframe 1 and subframe 6 in a radio frame, and the set K comprises elements 8, 7, 6, 5, and 4.

4. An information transmission method, comprising:
detecting, by a user equipment in a downlink subframe set N, wherein N is a set of subframe numbers in a radio frame, a physical downlink shared channel (PDSCH) transmission or a downlink control channel indicating downlink semi-persistent scheduling (SPS) release; and
sending, by the user equipment in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
wherein:
if the PDSCH transmission or the downlink control channel indicating downlink SPS release corresponds to the first serving cell, the uplink subframe n is subframe 0 and subframe 5 in a radio frame, and the set K is $\{8, 7, 6, 5, 4\}$; or
if the PDSCH transmission or the downlink control channel indicating downlink SPS release corresponds to the second serving cell, the uplink subframe n is subframe 1 and subframe 6 in a radio frame, and the set K is $\{8, 7, 6, 5, 4\}$; and
wherein the first serving cell and the second serving cell are both serving cells corresponding to the user equipment, and duplexing manners corresponding to the first serving cell and the second serving cell are both frequency division duplex (FDD).

5. An information transmission method, comprising:
sending, by a base station in a downlink subframe set N to a user equipment, a physical downlink shared channel (PDSCH) transmission or a downlink control channel indicating downlink semi-persistent scheduling (SPS) release, wherein N is a predefined set of subframe numbers in a radio frame; and
receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
wherein:
serving cells corresponding to the user equipment include a first serving cell and a second serving cell, a duplexing manner corresponding to the first serving cell is frequency division duplex (FDD), and a duplexing manner corresponding to the second serving cell is time division duplex (TDD);
the PDSCH transmission or the downlink control channel indicating downlink SPS release corresponds to the first serving cell, and
the uplink subframe n is subframe 0, subframe 1, subframe 5, and subframe 6 in a radio frame, wherein:
the set K comprises elements 7, 6 and 5 when the uplink subframe n is subframe 0 and subframe 5 in the radio frame, and the set K comprises elements 5 and 4 when the uplink subframe n is subframe 1 and subframe 6 in the radio frame.

6. The method according to claim 5, wherein:
if the base station is a base station corresponding to the first serving cell, and the PDSCH transmission or the downlink control channel indicating downlink SPS release corresponds to the first serving cell, receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release comprises:
in the uplink subframe n corresponding to the downlink subframe set N, receiving, by the base station on the first serving cell, the hybrid automatic repeat request-acknowledgment response that is sent by the user equipment and that corresponds to the PDSCH transmission or corresponds to the downlink control channel indicating downlink SPS release; or
if the base station is a base station corresponding to the second serving cell, and the PDSCH transmission or the downlink control channel indicating downlink SPS release corresponds to the second serving cell, receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release comprises:
in the uplink subframe n corresponding to the downlink subframe set N, receiving, by the base station on the second serving cell, the hybrid automatic repeat request-acknowledgment response that is sent by the user equipment and that corresponds to the PDSCH transmission or corresponds to the downlink control channel indicating downlink SPS release; and
wherein the first serving cell and the second serving cell are both serving cells corresponding to the user equipment.

7. An information transmission method, comprising:
sending, by a base station in a downlink subframe set N to a user equipment, a physical downlink shared channel (PDSCH) transmission or a downlink control channel indicating downlink semi-persistent scheduling (SPS) release, wherein N is a set of subframe numbers in a radio frame; and
receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
wherein:
the uplink subframe n is subframe 0 and subframe 5 in a radio frame, and the set K comprises elements 8, 7, 6, 5, and 4; or
the uplink subframe n is subframe 1 and subframe 6 in a radio frame, and the set K comprises elements 8, 7, 6, 5, and 4.

8. An information transmission method, comprising:
sending, by a base station in a downlink subframe set N to a user equipment, a physical downlink shared channel (PDSCH) transmission or a downlink control channel indicating downlink semi-persistent scheduling (SPS) release, wherein N is a set of subframe numbers in a radio frame; and
receiving, by the base station in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
wherein:
if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is $\{8, 7, 6, 5, 4\}$; or
if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is $\{8, 7, 6, 5, 4\}$; and
wherein the first serving cell and the second serving cell are both serving cells corresponding to the user equipment, and duplexing manners corresponding to the first serving cell and the second serving cell are both frequency division duplex (FDD).

9. User equipment, comprising:
a receiver, configured to detect, in a downlink subframe set N, a physical downlink shared channel (PDSCH) transmission or a downlink control channel indicating downlink semi-persistent scheduling (SPS) release; and
a transmitter, configured to send, in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;
wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
wherein:
serving cells corresponding to the user equipment include a first serving cell and a second serving cell, a duplexing manner corresponding to the first serving cell is frequency division duplex (FDD), and a duplexing manner corresponding to the second serving cell is time division duplex (TDD);

the PDSCH transmission or the downlink control channel indicating downlink SPS release corresponds to the first serving cell, and the uplink subframe n is subframe 0, subframe 1, subframe 5, and subframe 6 in a radio frame, wherein:

the set K comprises elements 7, 6 and 5 when the uplink subframe n is subframe 0 and subframe 5 in the radio frame, and the set K comprises elements 5 and 4 when the uplink subframe n is subframe 1 and subframe 6 in the radio frame.

10. The equipment according to claim 9, wherein:

if the PDSCH transmission or the downlink control channel indicating downlink SPS release corresponds to the first serving cell, the transmitter is configured to:

in the uplink subframe n corresponding to the downlink subframe set N, send, on the first serving cell, the hybrid automatic repeat request-acknowledgment response that corresponds to the PDSCH transmission or corresponds to the downlink control channel indicating downlink SPS release; or if the PDSCH transmission or the downlink control channel indicating downlink SPS release corresponds to the second serving cell, the transmitter is configured to:

in the uplink subframe n corresponding to the downlink subframe set N, send, on the second serving cell, the hybrid automatic repeat request-acknowledgment response that corresponds to the PDSCH transmission or corresponds to the downlink control channel indicating downlink SPS release; and wherein the first serving cell and the second serving cell are both serving cells corresponding to the user equipment.

11. User equipment, comprising:

a receiver, configured to detect, in a downlink subframe set N, a physical downlink shared channel (PDSCH) transmission or a downlink control channel indicating downlink semi-persistent scheduling (SPS) release; and a transmitter, configured to send, in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;

wherein a correspondence between the downlink subframe set N and the uplink subframe n is N={$n-k_0$, $n-k_1$, . . . , $n-k_{M-1}$}, wherein $k_0$, $k_1$, . . . , $k_{M-1}$ are positive integers and are elements in a set K, and M is a quantity of elements comprised in the set K; and wherein:

the uplink subframe n is subframe 0 and subframe 5 in a radio frame, and the set K comprises elements 8, 7, 6, 5, and 4; or the uplink subframe n is subframe 1 and subframe 6 in a radio frame, and the set K comprises elements 8, 7, 6, 5, and 4.

12. User equipment, comprising:

a receiver, configured to detect, in a downlink subframe set N, a physical downlink shared channel (PDSCH) transmission or a downlink control channel indicating downlink semi-persistent scheduling (SPS) release; and a transmitter, configured to send, in an uplink subframe n corresponding to the downlink subframe set N, a hybrid automatic repeat request-acknowledgment response that corresponds to the PDSCH transmission or corresponds to the downlink control channel indicating downlink SPS release, wherein n is a subframe number, and n is an integer greater than or equal to 0;

wherein a correspondence between the downlink subframe set N and the uplink subframe n is N={$n-k_0$, $n-k_1$, . . . , $n-k_{M-1}$}, wherein $k_0$, $k_1$, . . . , $k_{M-1}$ are positive integers and are elements in a set K, and M is a quantity of elements comprised in the set K; and wherein:

if the PDSCH transmission or the downlink control channel indicating downlink SPS release corresponds to the first serving cell, the uplink subframe n is subframe 0 and subframe 5 in a radio frame, and the set K is {8, 7, 6, 5, 4}; or if the PDSCH transmission or the downlink control channel indicating downlink SPS release corresponds to the second serving cell, the uplink subframe n is subframe 1 and subframe 6 in a radio frame, and the set K is {8, 7, 6, 5, 4}; and wherein the first serving cell and the second serving cell are both serving cells corresponding to the user equipment, and duplexing manners corresponding to the first serving cell and the second serving cell are both frequency division duplex (FDD).

13. An information transmission device, wherein the information transmission device is a base station, comprising:

a transmitter, configured to send, in a downlink subframe set N to user equipment, a physical downlink shared channel (PDSCH) transmission or a downlink control channel indicating downlink semi-persistent scheduling (SPS) release; and a receiver, configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;

wherein a correspondence between the downlink subframe set N and the uplink subframe n is N={$n-k_0$, $n-k_1$, . . . , $n-k_{M-1}$}, wherein $k_0$, $k_1$, . . . , $k_{M-1}$ are positive integers and are elements in a set K, and M is a quantity of elements comprised in the set K; and wherein:

serving cells corresponding to the user equipment include a first serving cell and a second serving cell, a duplexing manner corresponding to the first serving cell is frequency division duplex (FDD), and a duplexing manner corresponding to the second serving cell is time division duplex (TDD);

the PDSCH transmission or the downlink control channel indicating downlink SPS release corresponds to the first serving cell, and the uplink subframe n is subframe 0, subframe 1, subframe 5, and subframe 6 in a radio frame, wherein:

the set K comprises elements 7, 6 and 5 when the uplink subframe n is subframe 0 and subframe 5 in the radio frame, and the set K comprises elements 5 and 4 when the uplink subframe n is subframe 1 and subframe 6 in the radio frame.

14. The device according to claim 13, wherein:

if the base station is a base station corresponding to the first serving cell, and the PDSCH transmission or the downlink control channel indicating downlink SPS release corresponds to the first serving cell, the receiver is configured to:
  in the uplink subframe n corresponding to the downlink subframe set N, receive, on the first serving cell, the hybrid automatic repeat request-acknowledgment response that is sent by the user equipment and that corresponds to the PDSCH transmission or corresponds to the downlink control channel indicating downlink SPS release; or
if the base station is a base station corresponding to the second serving cell, and the PDSCH transmission or the downlink control channel indicating downlink SPS release corresponds to the second serving cell, the receiver is configured to:
  in the uplink subframe n corresponding to the downlink subframe set N, receive, on the second serving cell, the hybrid automatic repeat request-acknowledgment response that is sent by the user equipment and that corresponds to the PDSCH transmission or corresponds to the downlink control channel indicating downlink SPS release; and
wherein the first serving cell and the second serving cell are both serving cells corresponding to the user equipment.

15. An information transmission device, wherein the information transmission device is a base station, comprising:
  a transmitter, configured to send, in a downlink subframe set N to user equipment, a physical downlink shared channel (PDSCH) transmission or a downlink control channel indicating downlink semi-persistent scheduling (SPS) release; and
  a receiver, configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;
  wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and wherein: the uplink subframe n is subframe 0 and subframe 5 in a radio frame, and the set K comprises elements 8, 7, 6, 5, and 4; or
  the uplink subframe n is subframe 1 and subframe 6 in a radio frame, and the set K comprises elements 8, 7, 6, 5, and 4.

16. An information transmission device, wherein the information transmission device is a base station, comprising:
  a transmitter, configured to send, in a downlink subframe set N to user equipment, a physical downlink shared channel (PDSCH) transmission or a downlink control channel indicating downlink semi-persistent scheduling (SPS) release; and
  a receiver, configured to receive, in an uplink subframe n corresponding to the downlink subframe set N, a hybrid automatic repeat request-acknowledgment response that is sent by the user equipment and that corresponds to the PDSCH transmission or corresponds to the downlink control channel indicating downlink SPS release, wherein n is a subframe number, and n is an integer greater than or equal to 0;
  wherein a correspondence between the downlink subframe set N and the uplink subframe n is $N=\{n-k_0, n-k_1, \ldots, n-k_{M-1}\}$, wherein $k_0, k_1, \ldots, k_{M-1}$ are positive integers and are elements in a set K, and M is a quantity of elements comprised in the set K; and
  wherein:
if the base station is the base station corresponding to the first serving cell, and the PDSCH transmission or the downlink control channel indicating downlink SPS release corresponds to the first serving cell, the uplink subframe n is subframe 0 and subframe 5 in a radio frame, and the set K is $\{8, 7, 6, 5, 4\}$; or
if the base station is the base station corresponding to the second serving cell, and the PDSCH transmission or the downlink control channel indicating downlink SPS release corresponds to the second serving cell, the uplink subframe n is subframe 1 and subframe 6 in a radio frame, and the set K is $\{8, 7, 6, 5, 4\}$; and
wherein the first serving cell and the second serving cell are both serving cells corresponding to the user equipment, and duplexing manners corresponding to the first serving cell and the second serving cell are both frequency division duplex (FDD).

\* \* \* \* \*